(12) United States Patent
Junkins et al.

(10) Patent No.: US 12,075,269 B2
(45) Date of Patent: *Aug. 27, 2024

(54) MEASURING QOE SATISFACTION IN 5G NETWORKS OR HYBRID 5G NETWORKS

(71) Applicant: Guavus, Inc., San Jose, CA (US)

(72) Inventors: Douglas Alan Junkins, Seattle, WA (US); Chris Stuart Neisinger, Danville, CA (US); Andrew Howard Colby, Boyds, MD (US)

(73) Assignee: GUAVUS, Inc., San Jose, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/473,797

(22) Filed: Sep. 13, 2021

(65) Prior Publication Data

US 2023/0082301 A1    Mar. 16, 2023

(51) Int. Cl.
| | | |
|---|---|---|
| *H04L 41/50* | (2022.01) | |
| *H04L 41/5009* | (2022.01) | |
| *H04L 43/028* | (2022.01) | |
| *H04W 24/08* | (2009.01) | |

(52) U.S. Cl.
CPC ......... *H04W 24/08* (2013.01); *H04L 41/5009* (2013.01); *H04L 43/028* (2013.01)

(58) Field of Classification Search
CPC ..... H04W 24/08; H04W 24/04; H04W 24/10; H04L 41/5009; H04L 43/028; H04L 41/5029; H04L 41/5067; H04L 41/507; H04L 43/08

See application file for complete search history.

(56) References Cited

U.S. PATENT DOCUMENTS

| | | | | |
|---|---|---|---|---|
| 2004/0109413 A1* | 6/2004 | Hierholzer | ............ | H04L 47/781 370/230 |
| 2012/0086814 A1* | 4/2012 | Tsubaki | ............. | H04N 21/2187 348/192 |
| 2014/0228053 A1* | 8/2014 | Zhou | ...................... | H04W 24/10 455/456.3 |

(Continued)

FOREIGN PATENT DOCUMENTS

| | | | | |
|---|---|---|---|---|
| CN | 103430606 B | * | 11/2016 | .......... H04B 7/2656 |
| CN | 112243259 A | * | 1/2021 | |

(Continued)

*Primary Examiner* — Said M Elnoubi

(57) ABSTRACT

A system and method for measuring quality of experience (QoE) satisfaction for an application accessing a CSP network is described. A QoE requirement is associated with an application executed on a mobile device that is communicatively coupled to a CSP network. The QoE requirement for the application includes a QoE latency requirement, a QoE bandwidth requirement, and a QoE packet loss rate requirement. An edge-collection module gathers a radio access network (RAN) data set, and a core network (CN) data set that includes a network data analytics function (NWDAF) data set. The QoE network appliance generates a measured QoE score with the RAN data set, the CN data set, and the NWDAF data set. The measured QoE score is associated with the latency measurement, the bandwidth measurement, and the packet loss rate measurement. A subscriber ID is billed when a charging function determines the measured QoE satisfies the QoE requirement.

30 Claims, 13 Drawing Sheets

(56) References Cited

U.S. PATENT DOCUMENTS

| | | | |
|---|---|---|---|
| 2014/0259012 A1* | 9/2014 | Nandlall | G06F 9/45558 |
| | | | 718/1 |
| 2018/0249378 A1* | 8/2018 | Farmanbar | H04L 47/18 |
| 2020/0187055 A1* | 6/2020 | Meredith | H04L 1/08 |

FOREIGN PATENT DOCUMENTS

| | | | | |
|---|---|---|---|---|
| CN | 112801797 A | * | 5/2021 | G06Q 40/04 |
| EP | 3716541 B1 | * | 3/2022 | H04L 43/08 |
| KR | 20090049786 A | * | 5/2009 | |

* cited by examiner

MEASURING QOE SATISFACTION IN 5G NETWORKS OR HYBRID 5G NETWORKS

FIELD

The description relates to a system and method for satisfying a quality of experience (QoE) requirement with a measured QoE score in 5G networks and/or hybrid 5G networks. More specifically, the system and method include a QoE network appliance that generates the measured QoE score, which is then compared to a QoE requirement for billing purposes—so that when the measured QoE score meets or exceeds the QoE requirement then a subscriber ID is billed.

BACKGROUND

There have been significant changes to mobile devices and the wireless networks that connect to mobile devices. The launch of 3G mobile devices and 3G wireless networks (in 2001) made it possible for smartphones to support streaming videos, surfing the Web, and downloading music. In 2010, 4G network were commercially deployed. The 4G networks were 10 times faster than 3G, so downloading games and streaming videos could be performed with minimum buffering and lags.

In 2019, 5G network were commercially deployed internationally. The 5G networks operate on a much higher frequency range than 4G. The peak speeds for a 4G network are 100 megabits per second for high mobility, e.g., cars, communications and 1 gigabit per second for low mobility, e.g., stationary, communications. The peak speeds for 5G networks are 10 gigabits per second.

The increased speed in a 5G network is achieved by using new higher-frequency radio waves (25-39 GHz) in addition to the existing low band (600-850 MHz) and medium band frequencies (2.5-3.7 GHz). However, higher frequency radio waves require smaller geographic cells than the low and medium band frequencies. The industry consortium setting standards for 5G is the $3^{rd}$ Generation Partnership Project (3GPP).

With the migration to 5G, there is a strong need for advanced analytics to also support closed-loop automation. New 5G services or improved services will be needed to justify the cost of upgrading a 4G network. Analytics may be used to support the migration to a 5G network, 5G services and improved services. Better 5G analytics can provide better insights into consumer activities and can show communication service providers (CSPs) how to deliver improved services and monetize them.

The challenge to communications service providers (CSPs) becomes how to integrate analytics into the network. Currently, analytics are complex because of various non-standardized interfaces, and because of inconsistent data collection techniques across network vendors. These concerns about analytics having non-standardized interfaces and inconsistent data collection techniques may be addressed by the network data analytics function (NWDAF), which is defined as part of the 5G Core (5GC) architecture by 3GPP. 3GPP is the standards development body for mobile networks.

NWDAF incorporates standard interfaces from the service-based architecture to collect data by subscription or request from other network functions and similar procedures. These standard interfaces deliver analytics functions in the network for automation or reporting, which solves the challenges related to non-standardized interfaces and inconsistent data collection.

Therefore, it would be beneficial to provide network analytics that allow a CSP to gain a view of the customer experience from the perspective of each individual customer and view how the network conditions are impacting customers from the network perspective.

It would also be beneficial to provide an analytics architecture that can be integrated with the services supported by the CSP network and the particular client devices using the CSP network.

Additionally, it would be beneficial to merge radio access network (RAN) performance data with slice-level telemetry from network data analytics function (NWDAF) and deep-packet inspection (DPI) network data.

Furthermore, it would be beneficial to enable a CSP network to understand subscriber expectations based on application usage in real-time or pseudo real-time.

Further still, it would be beneficial to determine whether the CSP network is satisfying the subscriber expectations.

Further yet, it would be beneficial to charge or bill the subscriber based on the CSP network satisfying the subscriber's expectations.

Still further, it would be beneficial to determine how to resolve CSP network issues that did not meet the subscriber's expectations.

Also, it would be beneficial to provide new 5G services or improved services to justify the cost of upgrading a 4G network.

SUMMARY

A system and method for measuring quality of experience (QoE) satisfaction for an application accessing a CSP network is described. The system includes a mobile device executing the application and having the mobile device communicatively coupled to the CSP network. A quality of experience (QoE) requirement is associated with the application. The QoE requirement for the application includes a QoE latency requirement, a QoE bandwidth requirement, and a QoE packet loss rate requirement. An edge-collection module gathers a radio access network (RAN) data set, and a core network (CN) data set that includes a network data analytics function (NWDAF) data set.

A QoE network appliance that includes a core compute and storage network component receives the RAN data set, the CN data set and the NWDAF data set from the edge-collection module. The QoE network appliance associates the RAN data set, the CN data set, and the NWDAF data set with a QoE latency measurement, a QoE bandwidth measurement, and a QoE packet loss rate measurement. The QoE network appliance determines the QoE requirement with the RAN data set, the CN data set, and the NWDAF data set. The QoE network appliance generates a measured QoE score with the RAN data set, the CN data set, and the NWDAF data set. Additionally, the measured QoE score is associated with the latency measurement, the bandwidth measurement, and the packet loss rate measurement.

The measured QoE score satisfies the QoE requirement by comparing the latency requirement, the bandwidth requirement, and the packet loss rate requirement associated with the QoE requirement, with the latency measurement, the bandwidth measurement, and the packet loss rate measurement associated with the measured QoE score. A subscriber ID is billed when a charging function determines the measured QoE satisfies the QoE requirement and the charging function, which is communicatively couple to a billing system, causes the billing system to bill the subscriber ID.

In one illustrative embodiment, the system includes a deep packet inspection (DPI) data set. The DPI data set is selected from the open system interconnection (OSI) group consisting of a network layer, a transport layer, a session layer, a presentation layer, and an application layer. The DPI data set is associated with the latency measurement, the bandwidth measurement, and the packet loss rate measurement. The DPI data set is also used to determine when the measured QoE score satisfies the QoE requirement.

In another illustrative embodiment, the edge-based collection module reduces a volume of data from at least one of the DPI data set, the RAN data set, the NWDAF data and the CN data set before communicating the reduced volume of data to the QoE network appliance. The DPI data set may also determine an optimal bandwidth measurement for a particular application, in which the optimal bandwidth measurement is associated with the measured QoE score. Additionally, the DPI data set determines an optimal latency measurement for the particular application, in which the optimal latency measurement is associated with the measured QoE score.

In yet another embodiment, the QoE network appliance forecasts a per device network load for a scaling model with at least one of the RAN data set, the NWDAF data set and the CN data set.

In a further embodiment, the QoE network appliance forecasts a per application network load for a scaling model with the DPI data set, the RAN data set, the NWDAF data set and the CN data set.

In a still further embodiment, the QoE network appliance forecasts a per location network load for a scaling model with the DPI data set, the RAN data set, the NWDAF data set and the CN data set.

In an even further embodiment, the system includes a CSP network policy, in which a reduced network performance is determined with the measured QoE score at an impacted area, and the CSP network alerts at least one mobile device of the reduced network performance.

In another embodiment, the system includes a CSP network policy that changes based on the measured QoE for the subscriber ID at a particular cell.

DRAWINGS

The present subject matter will be more fully understood by reference to the following drawings which are presented for illustrative, not limiting, purposes.

Figure 6A:
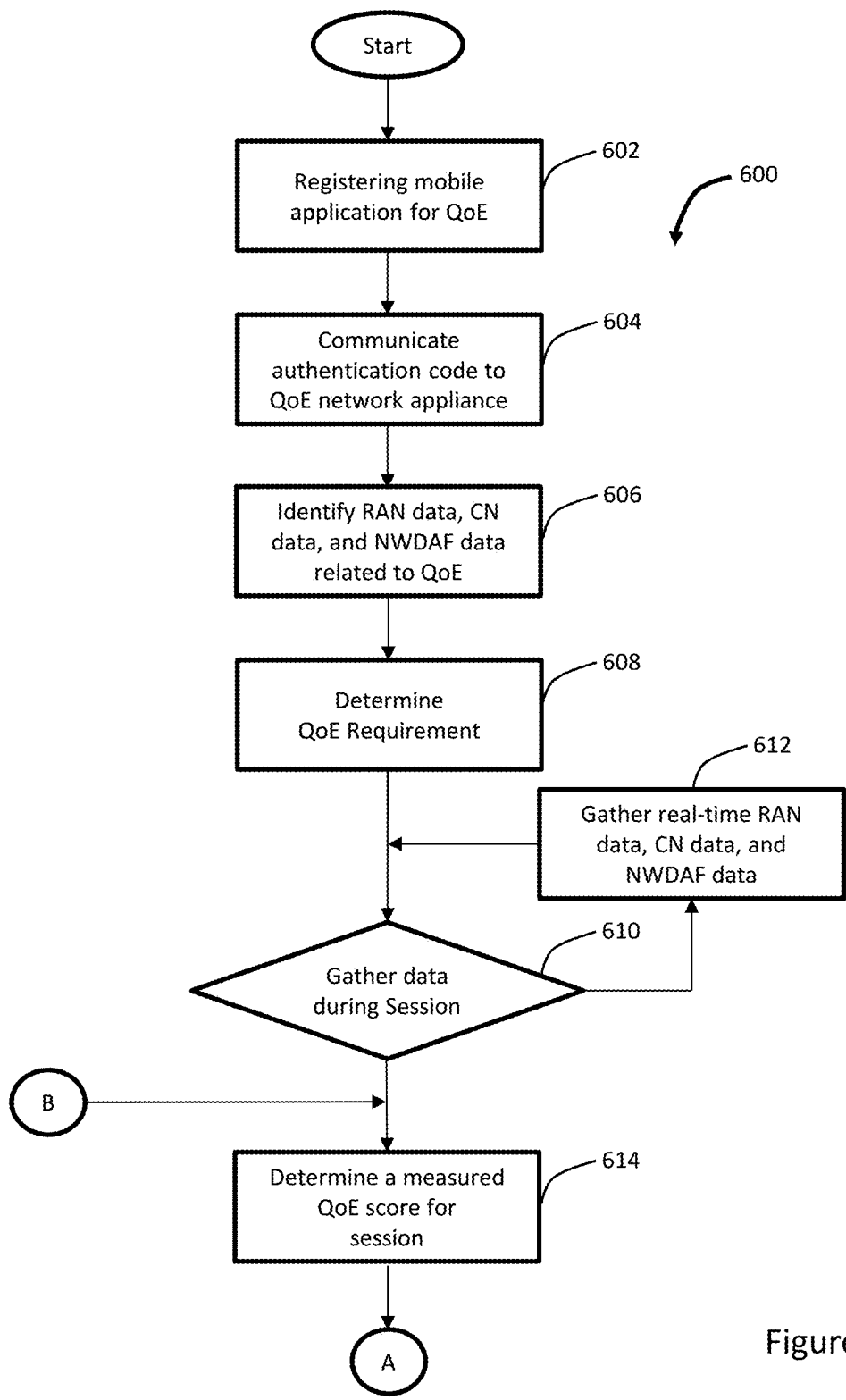
Figure 6B:
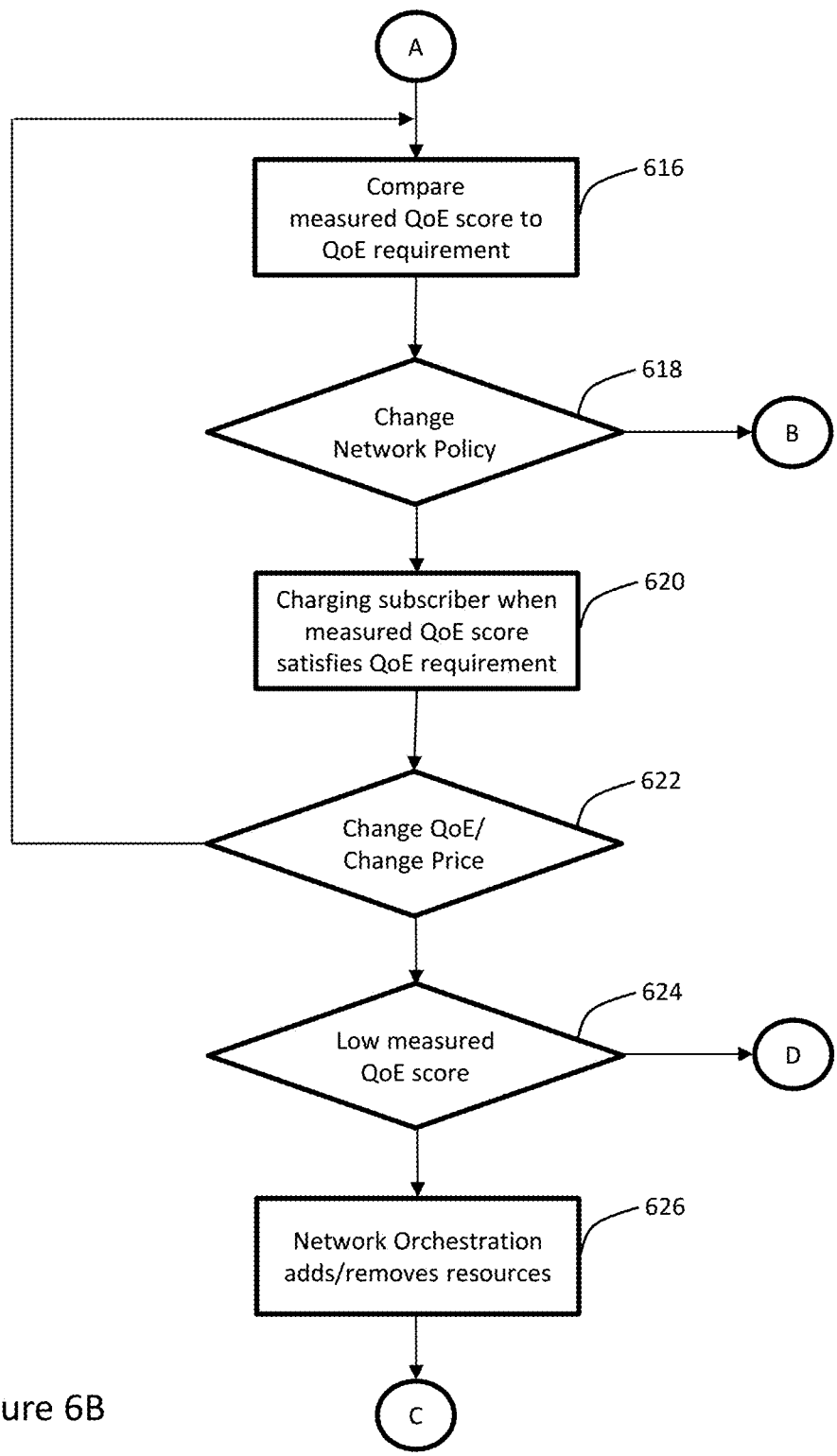
Figure 6C:
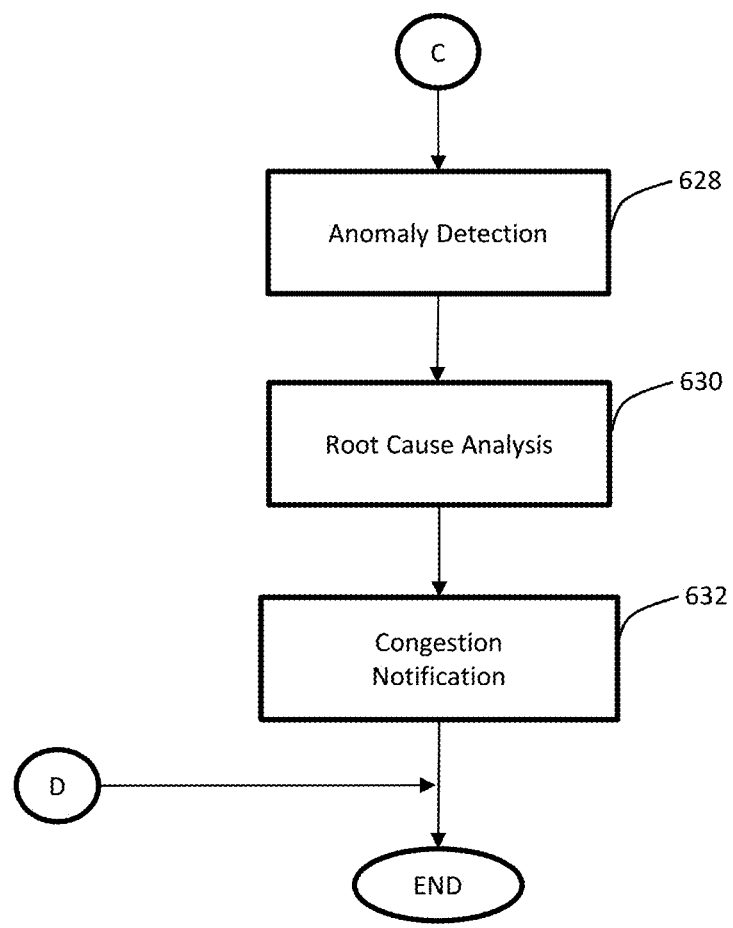

FIGS. 6A, 6B, and 6C show an illustrative flowchart for determining a QoE requirement, measuring satisfaction of QoE, billing for QoE, resolving unsatisfactory QoE.

Figure 7:
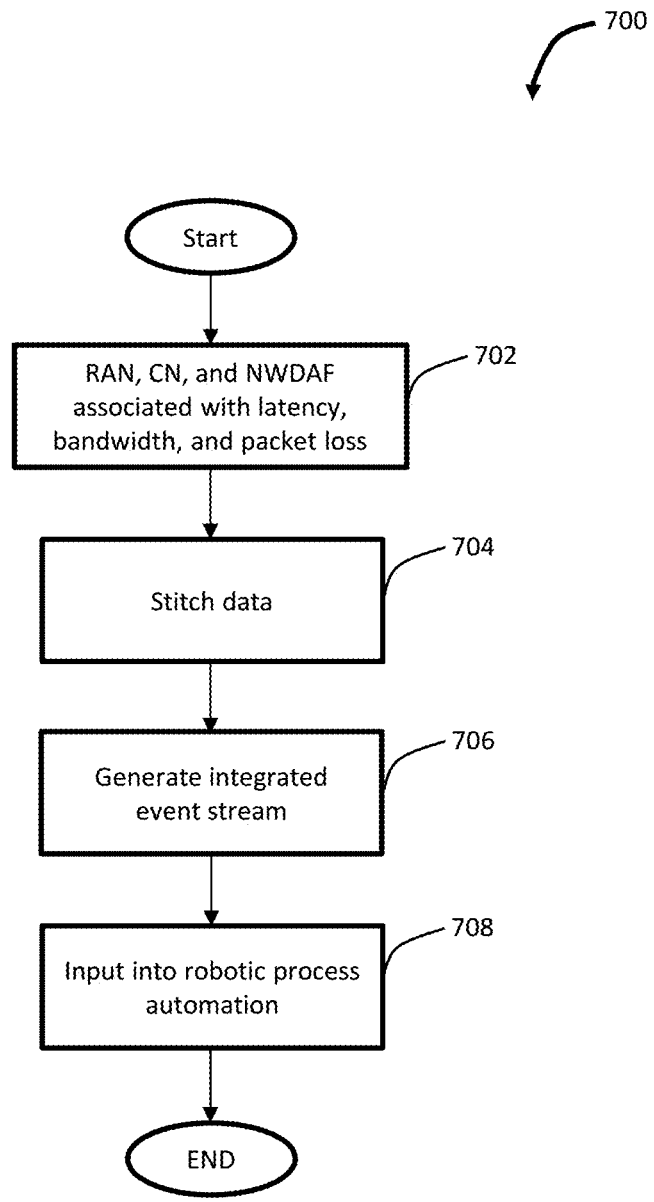

FIG. 7 shows a method for generating an integrated event stream that is communicated to a robotic process automation (RPA) module.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. Additionally, the methods may vary as to details, order of the actions, or other variations without departing from the illustrative methods disclosed herein.

The systems and methods described herein can be used to support a migration to 5G networks, 5G services and improved hybrid services. Additionally, the systems and methods described herein include network analytics that provide better insights about subscriber usage and show a communications service provider (CSP) how to deliver improved services and monetize them. Furthermore, the systems and methods described herein overcome the CSP challenges of integrating network analytics into the CSP network. Further still, the systems and methods described herein overcome the complexity associated with various non-standardized interfaces and inconsistent data collection techniques across network vendors.

The systems and methods described herein allow a CSP to understand the customer experience in real-time and view how the network conditions are affecting the customer. Additionally, the systems and methods provide an analytics architecture that can be integrated with the services supported by the CSP network and the particular client devices using the CSP network. Furthermore, the systems and methods described herein merge radio access network (RAN) performance data with slice-level telemetry from network data analytics function (NWDAF) and deep-packet inspection (DPI) network data. Further still, the systems and methods enable a CSP to view the network resources utilized by subscribers based on the network slice architecture, a cell site, a device type, or a customer segment.

A Radio Access Network (RAN) is part of a telecommunication system that utilizes a Radio Access Technology (RAT). The RAN resides between User Equipment (UE) and provides a connection to a Core Network (CN). A base station is related to a site coverage area and may include a cell site, a sector, a frequency or any other parameter associated with the RAN site that may be monitored, controlled or the combination thereof. User Equipment (UE) includes devices such as a smartphone, mobile phones, a computer, an IoT device, and other such devices. Radio Access Technologies (RATs) refers to the underlying physical connection method for a radio-based communication network. For example, a smartphone may contain several RATs such as Bluetooth, Wi-Fi, 3G, 4G, LTE and 5G. Data flow is measured in bytes per second.

The network analytics described herein are used to deliver new services that leverage 3GPP standards based architecture for 5G networks and hybrid 4G/5G networks. The term "hybrid 4G/5G networks" is also used interchangeably to refer to a "hybrid 5G network." The network analytics described herein also provide an ability to determine a Quality of Experience (QoE) requirement and make it a billable asset for the CSP. For example, the QoE requirements may be determined with Radio Access Network (RAN) data, Deep Packet Inspection (DPI) data, and Network Data Analytics Function (NWDAF) data.

The systems and methods presented herein enable the CSP to offer differentiated services based on user experience and bill based on the CSP delivery of a Quality of Experience (QoE). QoE refers to a measure of the customer experience with a service, e.g., streaming video, gaming, phone call, TV broadcast. QoE focuses on the entire service experience and is a holistic concept. More specifically, QoE is defined as the degree of delight or annoyance of the user with an application or service—and QoE results from the fulfilment of his or her expectation with respect to the utility and/or enjoyment of the application or service in light of the user's personality and current state.

QoE is distinguishable for Quality of Service (QoS). QoS is the description or measurement of the overall performance of a service, such as a telephony or computer network or a cloud computing service, particularly the performance seen by the users of the network. To quantitatively measure quality of service, several related aspects of the network service are often considered, such as packet loss, bit rate, throughput, transmission delay, availability, jitter, and other such network analytics.

To effectively determine the QoS in a 5G network, the CSP must have accurate network analytics that constantly determine how a subscriber uses the network, the subscribers experience, how the network delivers packets to the subscriber, and the cost of continuously delivering packets.

Network analytics are commonly used for QoS purposes. Network analytics can also be used for QoE purposes to provide a deep understanding of how the CSP network is delivering packets to the customer. The systems and methods described herein monitor each session, from the application type, network slice loading, and RAN resource utilization and performance to provide true visibility into the QoE. The systems and methods described herein utilize network analytics to determine QoE in hybrid 5G and 5G networks. For example, the QoE network analytics may include data sets for Radio Access Network (RAN) performance, RAN quality and slice level telemetry from Network Data Analytics Function (NWDAF). These network analytics may be integrated with deep packet inspection (DPI) data sets. These network analytics allow the CSP network to monitor real-time network performance, real-time network usage, and the QoE for each subscriber.

As described herein, NWDAF is used to perform at least two different types of processes in the systems described herein. The first process performed by NWDAF is edge collection of data with a NWDAF edge collector, which is referred to as NWDAF edge collection, which is described in FIG. 2B. The second process performed by an NWDAF application is gathering data sets from various elements of the 5G core as presented, which generates an NWDAF integrated event stream as described with the system elements presented in FIG. 1B and the process steps presented in FIG. 7.

Note, the NWDAF integrated event stream only includes NWDAF. A more general reference is also made to an "integrated event stream" that includes RAN information, and core network (CN) information, and DPI information. In general, the integrated event stream refers to data captured by the WAN/data bus associated with a QoE network appliance that is communicatively coupled to a robotic process automation (RPA) module—as described in further detail below. The integrated event stream may include data sets collected from other edge base collectors. The integrated event stream may include network events. Network events may also include all requests caused by a user interaction, a user action, a network interaction, a subrequest.

NWDAF may also operate as a network element that interacts with a variety of different network elements. In the illustrative embodiment, the NWDAF integrated event stream includes RAN data, CN data, and possibly DPI, which is used to determine a measured QoE score that determines when the CSP is meeting the QoE requirement.

A low measured QoE score may result in a robotic process automation (RPA) module determining an action that must be taken to improve the measured QoE score. In this illustrative embodiment, the NWDAF may operate as a network element that notifies the subscriber about the QoE— this is referred to as a "subscriber" notification and is described in FIG. 6. The NWDAF may also operate as a network element with respect to a network operation notification that is also described further in FIG. 6.

The systems and methods presented herein rely on NWDAF for network analytics to overcome non-standardized interfaces and inconsistent data collection techniques. NWDAF incorporates standard interfaces from the service-based architecture to collect data by subscription or request from other network functions and similar procedures. These standard interfaces deliver analytics functions in the network for automation or reporting, which overcomes the challenges related to non-standardized interfaces and inconsistent data collection.

Analytics are not limited to NWDAF. CSPs monitor and analyze other network resources. For example, the CSP network analytics may analyze the network from various perspectives such as per slice, per cell site, per device type, or other such network variable. The systems and methods described herein provide network analytics that allow a CSP to gain a perspective of the customer experience from each individual subscriber and view how the network conditions are impacting subscriber QoE. The network analytics architecture described herein can be integrated with the services supported by the CSP network and the particular client devices using the CSP network. The systems and methods presented herein merge radio access network (RAN) performance data with slice-level telemetry from network data analytics function (NWDAF) and deep-packet inspection (DPI) network data.

More specifically, the network data analytics function (NWDAF) allows network function (NF) consumers to subscribe to and unsubscribe from different analytic events. Also, this service notifies NF consumers with a corresponding subscription about observed events. The types of observed events include load level of network slice instance, service experience for an application or for a network slice, NF load analytics information for a specific NF or a list of NFs, network performance in an area of interest, expected behaviour information for a group of user equipment (UE) or a specific UE, abnormal behaviour information for a group of UEs or a specific UE, mobility related information for a group of UEs or a specific UE, communication pattern for a group of UEs or a specific UE, congestion information of user data in a specific location, and QoS sustainability for a certain area and time period, reports QoS change statistics or predicts the likelihood of a QoS change. NWDAF provides analytics information for different analytic events to NF consumers. NWDAF allows NF consumers to subscribe to and unsubscribe from periodic notifications and/or notification when an event is detected.

5G systems are designed based on new network technologies that include network function virtualization (NFV), software-defined networking (SDN) and network slicing. 5G systems support service based architecture (SBA) which allows the network functions (NF) to discover other network services and communicate, unlike the older technologies where they had predefined interfaces between entities. The service-oriented architecture in the 5G system is more flexible, customizable, and scalable. The 5G systems support the stateless network functions where the compute resource elements are decoupled from the storage resource elements.

The Network Slice Selection Function (NSSF) supports taking information from the NWDAF into consideration for slice selection. The NSSF accesses the NWDAF events subscription service. Network slicing is a specific form of virtualization that allows multiple logical networks to run on top of a shared physical network infrastructure. The key benefit of the network slicing concept is that it provides an end-to-end virtual network encompassing not just networking but compute and storage functions too. The objective is to allow a physical mobile network operator to partition its network resources to allow for different users, so-called tenants, to multiplex over a single physical infrastructure. The most commonly cited example in 5G discussions is sharing of a given physical network to simultaneously run Internet of Things (IoT), Mobile Broadband (MBB), and very low-latency (e.g., vehicular communications) applications. These applications have different transmission characteristics. For example, IoT has a large number of devices, but each device may have low throughput. MBB has nearly the opposite properties since it will have a much smaller number of devices, but each one will be transmitting or receiving high bandwidth content. The intent of network slicing is to be able to partition the physical network at an end-to-end level to allow optimum grouping of traffic, isolation from other tenants, and configuring of resources at a macro level.

Network slicing in 5G is expected to open new business opportunities for mobile operators and other newer entrants. For example, a CSP network can split its physical network resources into multiple logical slices and lease these slices out to interested parties. For example, an electrical utility may want to have a long-term lease of a network slice for connectivity to its smart grid composed of sensors, meters, and controllers and optimize that slice for IoT devices. Alternatively, a concert promoter may want to take a short-term lease of a network slice for a week-long musical festival and optimize that slice for streaming HD music and Voice over Internet Protocol (VoIP) connectivity.

A typical 5G network includes an access network and a core network. The 5G access network includes user equipment (UE) supporting a 5G new radio, a base station that supports 5G new radio (gNB) and existing LTE eNodeB upgraded to support 5G new radio. The 5G core network introduced a service based architecture (SBA) that replaced traditional nodes with individual network functions, which run in a completely virtualized environment. There are various network functions in the 5G core that include an access and mobility management function (AMF), a session management function (SMF), a user plane function (UPF), a network exposure function (NEF), an application function (AF), a policy control function (PCF), a network repository function (NRF), a unified data management (UDM), an authentication server function (ASF), unified data repository (UDR) and network slice selection function (NSSF).

The 5G system provides a wide range of services and applications that have different characteristics and performance requirements such as enhanced mobile broadband (eMBB), ultra-reliable and low latency communications (URLLC) and massive machine type communication (mMTC). Enhanced mobile broadband (eMBB) are data driven services that provide greater bandwidth with moderate latency such as office productivity scenarios, user upload and sharing multimedia files, remote education scenarios, and enhanced broadband in fast moving trains and airplanes. Ultra-reliable and low latency communications (URLLC) are provided to mission critical services; and the services are extremely low latency and high reliability. Power plants, military applications, remote surgeries, industrial automation, tactile Internet, disaster, and emergency service require very low latency and high reliability. Massive machine type communications (mMTC) support a large number of devices within a small area, which communicate data sporadically. Illustrative use cases include Internet-of-Things (IoT), smart metering and street video recording.

Figure 1A:
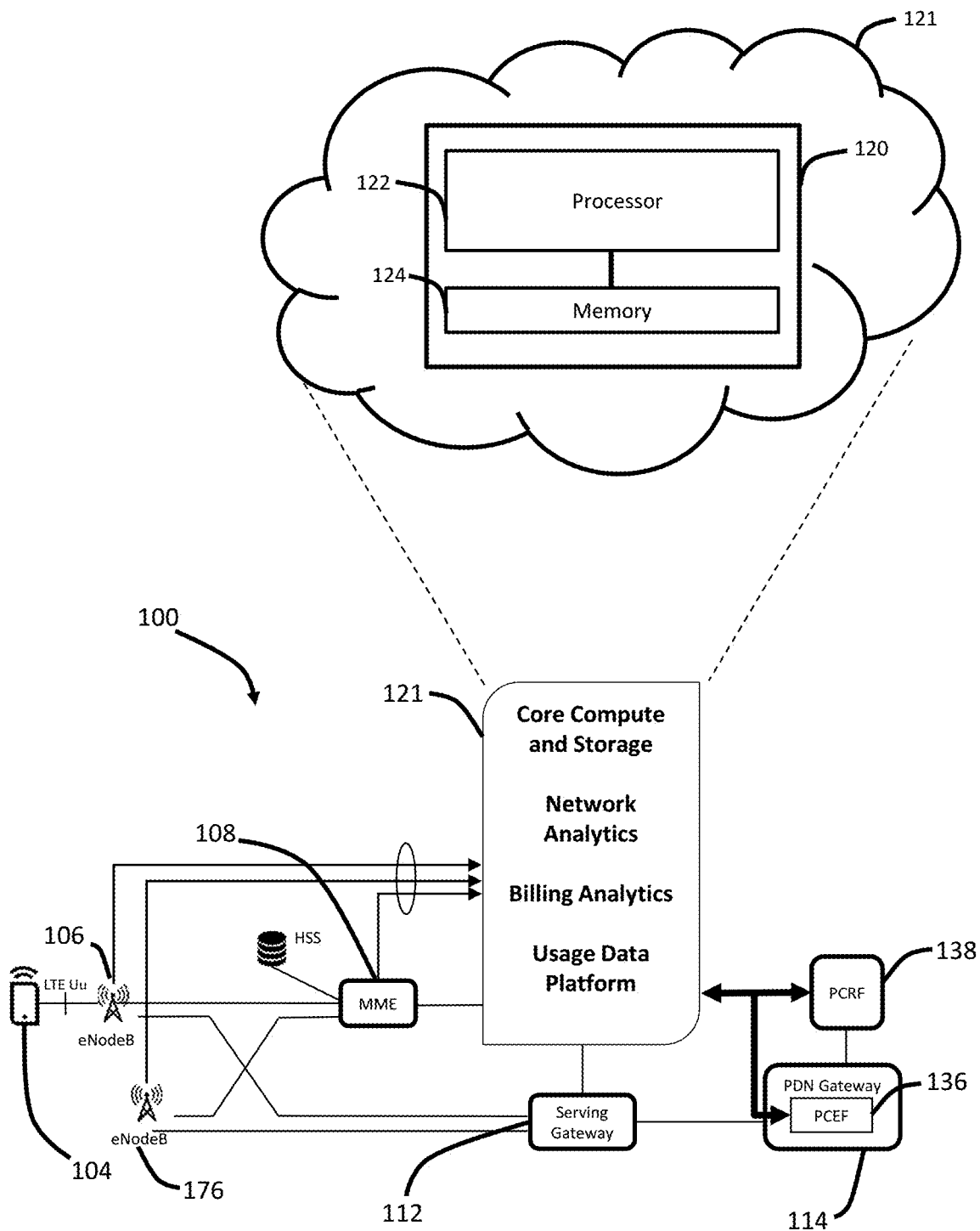
FIG. 1A shows an illustrative radio access network (RAN) system that provides a smartphone with Internet connectivity.

Referring to FIG. 1A, there is shown an illustrative radio access network (RAN) system 100, e.g. an LTE network, which provides mobile devices 104, i.e., User Equipment (UE), such as a smartphone with Internet connectivity. Note, reference to UE 104 is also made by referring interchangeably to a mobile device, a wireless device, a client, a wireless client and other such more common references to UE. The illustrative mobile device 104 communicates with at least one eNodeB 106. The illustrative mobile device 104 may include an International Mobile Subscriber Identity (IMSI).

More generally, the illustrative mobile device 104 may include a personal computer, a laptop, a tablet computer, or a smartphone. The mobile device 104 may be operationally coupled to a wide area network (WAN) such as the Internet by being communicatively coupled to a Radio Access Network (RAN) associated with a service provider network. The mobile device 104 may also be communicatively coupled to the WAN via a Wi-Fi (or Bluetooth) access point (not shown) that is communicatively coupled to an illustrative modem (not shown), which is communicatively coupled to the WAN.

In operation, the mobile device 104 downloads an application from an app store and executes the application on the mobile device 104. The mobile device 104 communicates a first message communicated to a QoE network appliance 121. The first message indicates that the application has been launched on the mobile device. A second message is communicated to the QoE network appliance. The second message indicates that the application is closed. In one embodiment, the first message received at the QoE network appliance 121 is associated with a QoE requirement. The QoE requirement that includes a QoE latency requirement, a QoE bandwidth requirement, or a QoE packet loss rate requirement;

The QoE network appliance 121 may be embodied as a dedicated device and/or as a network based service. In one embodiment, the QoE network appliance 121 includes a stand-alone network device, e.g., a dedicated server 120 having a processor 122 and memory 124.

The QoE network appliance 121 may also be embodied as a network based service 121, which is also referred to interchangeably as a cloud-based service. The cloud-based service may operate as one of four fundamental cloud service models, namely, infrastructure as a service (IaaS), platform as a service (PaaS), software as a service (SaaS), and network as a service (NaaS). The cloud service models are deployed using different types of cloud deployments that include a public cloud, a community cloud, a hybrid cloud, and a private cloud.

Infrastructure as a service (IaaS) is the most basic cloud service model. IaaS providers offer virtual machines and other resources. The virtual machines, also referred to as "instances," are run as guests by a hypervisor. Groups of hypervisors within the cloud operational support system support large numbers of virtual machines and the ability to scale services up and down according to customers' varying requirements. IaaS clouds often offer additional resources such as images in a virtual machine image library, raw (block) and file-based storage, firewalls, load balancers, IP addresses, virtual local area networks (VLANs), and software bundles. IaaS cloud providers supply these resources on demand from their large pools installed in data centers. For wide area connectivity, the Internet or virtual private networks (VPNs) can be used.

Platform as a service (PaaS) enables cloud providers to deliver a computing platform that may include an operating system, a programming language execution environment, a database, and a web server. Application developers can develop and run their software solutions on the PaaS without the cost and complexity of buying and managing the underlying hardware and software layers. With some PaaS solutions, the system resources scale automatically to match application demand, so the cloud end user does not have to allocate resources manually.

Software as a service (SaaS) enables cloud providers to install and operate application software in the cloud. Cloud end users access the software from cloud clients. The cloud end users do not manage the cloud infrastructure and platform that runs the application. The SaaS application is different from other applications because of scalability. Higher throughput can be achieved by cloning tasks onto multiple virtual machines at run-time to meet the changing work demand. Load balancers in the SaaS application distribute work over a set of virtual machines. To accommodate a large number of cloud end users, cloud applications may be multitenant and serve more than one cloud end user organization. Some SaaS solutions may be referred to as desktop as a service, business process as a service, test environment as a service, communication as a service, etc.

The fourth category of cloud services is Network as a service (NaaS), in which the capability provided to the cloud service end user is to use a network/transport connectivity service, an inter-cloud network connectivity service, or the combination of both. NaaS involves the optimization of resource allocations by considering network and computing resources as a unified whole. Traditional NaaS services include flexible and extended VPNs, and bandwidth on demand.

There are different types of cloud deployment models for the cloud based service, which include a public cloud, a community cloud, a hybrid cloud, and a private cloud. In a public cloud, applications, storage, and other resources are made available to the general public by a service provider. These services are free or offer a pay-per-use model.

The community cloud infrastructure is between several organizations from a community with common concerns, and can be managed internally or by a third-party, and hosted internally or externally; so the costs are spread over fewer users than a public cloud (but more than a private cloud).

The private cloud infrastructure is dedicated for a single organization, whether managed internally or by a third-party, and hosted internally or externally. A private cloud project requires virtualizing the business environment, and it requires that the organization reevaluate decisions about existing resources.

The hybrid cloud is a composition of two or more clouds (private, community or public) that remain unique entities but are bound together, offering the benefits of multiple deployment models. Hybrid cloud architecture requires both on-premises resources and off-site (remote) server-based cloud infrastructure. Although hybrid clouds lack the flexibility, security, and certainty of in-house applications, the hybrid cloud provides the flexibility of in-house applications with the fault tolerance and scalability of cloud-based services.

Referring back to FIG. 1A, the illustrative radio network system 100 provides User Equipment 104 (UE) such as a smartphone with Internet connectivity. When the mobile device 104 has data to send to or receive from the Internet, it sets up a communication channel between itself and the Packet Data Network Gateway 114. This involves message exchanges between the UE 104 and the Mobility Management Entity (MME) 108. The Packet Data Network (PDN) gateway 114 performs policy enforcement, packet filtering for each user, charging support, lawful inspection, and packet screening. Additionally, the PDN gateway 114 includes a Policy and Charging Enforcement Function (PCEF) 136, which communicates with a Policy Charging Rules Function (PCRF) 138. The PCRF is a software node that determines policy rules in a multimedia network in real time. Additionally, the PCRF is the part of the network architecture that aggregates information to and from the network, operational support systems, and other sources (such as portals) in real time, supporting the creation of rules and then automatically making policy decisions for each subscriber active on the network. The PCEF 136 and PCRF 138 are both communicatively coupled to the QoE network appliance 121.

In coordination with the eNodeB base station 106, the Serving Gateway 112, and the Packet Data Network Gateway 114, data plane tunnels are established between the base station 106 and the Serving Gateway 112, and between the Serving Gateway 112 and the Packet Data Network Gateway 114. The network establishes a virtual communication channel, called an Evolved Packet switched System (EPS) bearer, to connect the UE 104 and the base station 106.

For network access and service, entities in the illustrative network 100 exchange control plane messages. A specific sequence of such control plane message exchange is called a network procedure. For example, when a mobile device 104 powers up, it initiates an attach procedure with the MME 108, which includes establishing a radio connection to the base station 106. Thus, each network procedure involves the exchange of several control plane messages between two or more entities. The specifications for these are defined by the various 3GPP Technical Specification Groups.

A network interaction includes detecting and monitoring network events. Network events may include all requests caused by a user interaction, a user action, a network interaction and a subrequest. By way of example and not of limitation, a network interaction is the set of HTTP requests and responses, or other sequence of logically related network traffic, caused by a user visit to a single web page or interaction with page elements. Also, a network interaction may be a single HTTP request and its corresponding responses such as zero or interim responses and single final response. A network interaction may also include a user action, which is a deliberate action by the user, via configuration, invocation, or selection, to initiate a network interaction, selection of a link, submission of a form, and reloading a page are examples of user actions. Furthermore, a network interaction may include a subrequest that is not directly initiated by user action. An example of a network interaction that includes a subrequest that is not initiated by a user action is an initial response in a hypermedia format that contains embedded references to stylesheets, images, frame sources, and onload actions will cause a browser, depending on its capabilities and configuration, to perform a corresponding set of automated subrequests to fetch those references using additional network interactions.

The user plane carries the network user traffic. The user plane is also referred to as data plane, carrier plane or bearer plane; the user plane contains data regarding the content that is sent or received by the user, e.g., text messages, voice, photos, videos and websites.

The control plane carries signaling traffic that is originated from or destined for a router. Control plane contains the data regarding management of the network. Control plane makes decisions about where traffic is sent. The control plane functions include the system configuration, management, and exchange of routing table information.

An illustrative session time having a variable time period may be defined as "variable" based on the variable duration of voice call, the variable duration of a gaming session, the variable duration of a streaming video session, or any other such variable time period for user selected data traffic. A fixed time interval period may be a fixed time interval during which the network events are monitored in a regular manner that is determined by a fixed time interval. Also, the session may be a combination of a variable time period and fixed time interval. For example, a video call may include detecting and monitoring the video quality at fixed intervals and detecting and monitoring the voice call quality at fixed intervals—additionally, voice and video quality may be detected and monitored for the duration of the video call.

Figure 1B:
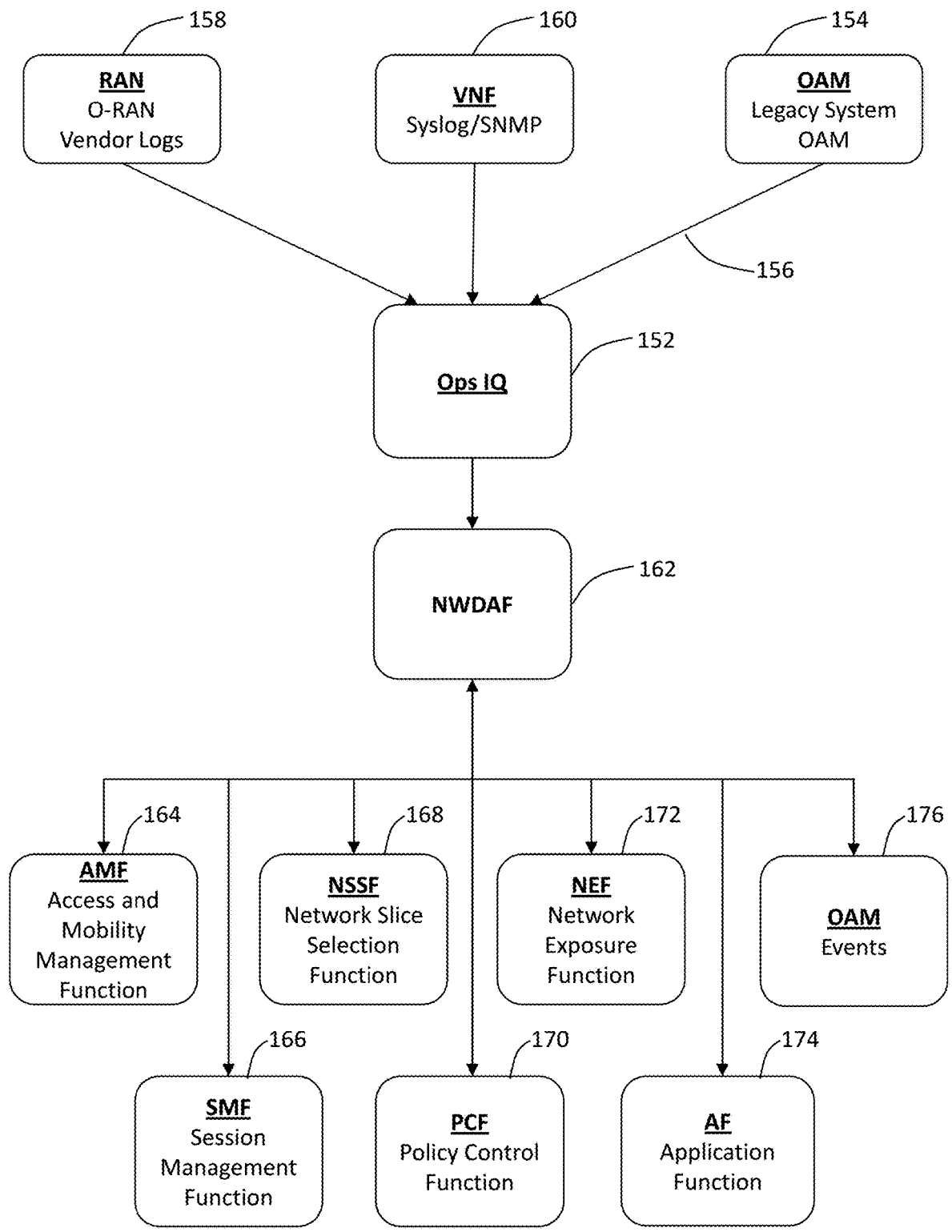
FIG. 1B shows data inputs and outputs to an OPS-IQ software module.

Referring to FIG. 1B, there is shown data inputs and outputs to an OPS-IQ software module. The OPS-IQ software module 152 is a real-time, context-aware, operational analytics powered by machine learning (ML) that ingests and processes alerts, alarms, and other telemetry data from disparate sources associated with the communications service provider (CSP). In operation, the OPS-IQ software module operates across multiple operational domains corresponding to dynamic physical and virtual CSP network infrastructure.

By way of example and not of limitation, the OPS-IQ software module 152 may be implemented either as a network element on a dedicated hardware device, as a software instance running on a dedicated hardware device, or as a virtualized function instantiated on an appropriate platform, e.g., on a cloud infrastructure.

The term "network element" as used herein refers to a facility or equipment used in the provisioning of a telecommunication service, and also includes features, functions, and capabilities that are provided by the facility or equipment including, but not limited to, subscriber numbers, databases, signaling systems, and information sufficient for billing and collection or used in the transmission, routing, or other provisioning of a telecommunication service.

The OPS-IQ software module 152 addresses CPS network and service issues through real-time ML based operational analytics, topology independent root issue analysis, fault correlation, fix recommendation, incident prediction and automatic trouble ticket generation. The OPS-IQ software module 152 is designed for network teams, service teams, field teams and customer care teams. The OPS-IQ software module 152 provides a self-healing network paradigm to prevent customer-impacting service degradations and outages. Additionally, the OPS-IQ software module 152 lowers operational expenditures and optimizes the overall customer experience (CX).

In general, the OPS-IQ software module 152 collects and correlates data from other network elements and OSS/BSS systems. OSS/BSS refers to operations support system (OSS) and business support system (BSS), respectively. CSPs support a broad range of services and functions, in which OSS includes order management, network inventory management and network operations and BSS includes order capture, customer relations management, and telecommunications billing.

More specifically, the OPS-IQ software module 152 includes three modules, namely, a network fault analytics module (not shown), a service experience analytics module (not shown), and a live ops analytics module (not shown). The network fault analytics module addresses alarm management challenges through advanced machine learning (ML) techniques to understand which alarms are important and most relevant and impact CX. The service experience analytics (SEA) module correlates network and service degradation issues with CX impact for a CX-first problem-solving approach using real-time detection and prediction, as well as prescriptive actions. Additionally, the SEA module provides a self-healing network in a highly dynamic virtualized network environment delivering optimized service delivery and subscriber QoE. The LiveOps analytics module manages network and customer-premises equipment (CPE) performance issues through time series analysis of operational network-based events using event data scoring and anomaly detection. The OPS-IQ software module 152 is a versatile data integration tool that receives and processes data from the SEA module and the LiveOps module. Additionally, the OPS-IQ software module 152 may be rules and topology independent.

In operation, the illustrative OPS-IQ software module 152 receives 3G and 4G datasets associated with a legacy system operation, administration, and management (OAM) 154. In the illustrative embodiment, OAM is a data collection source. OAM is not specified by 3GPP but stands for Operations, Administration and Maintenance (OAM), which refers to the processes and functions used in provisioning and managing a network or element within a network. The NWDAF/OAM interface 156 runs specific scripts to make other applications work better. There are two types of OAM. The first type of OAM relates to legacy 4G networks or "transport OAM." The second type of OAM is related to 5G and can combine OAM-IP and OAM-5G. Note, with respect to the 5G systems and NWDAF data sets, there is no need for a data collection source, e.g., OAM, because the data sets are delivered directly. Also, the NWDAF data sets are shared with the OAM data collection, which supports receiving observed service experience from the NWDAF.

The OPS-IQ software module 152 also receives RAN data 158 from 4G networks. RAN data 158 can be collected from access mobility management function (AMF) 164, open radio access network (O-RAN) and traditional network equipment providers (NEPs). By way of example, the RAN data 158 includes per call trace data having approximately 60 data sources, power, bears and other such trace data. The RAN data 158 can support log analysis, which further supports maintenance use cases. For example, the RAN data collects information directly from data sources every two minutes, but not in real-time.

Additionally, the OPS-IQ software module 152 receives virtualized network function (VNF) data 160. VNFs are virtualized network services running on open computing platforms formerly carried out by proprietary, dedicated hardware technology. Common VNFs include virtualized routers, firewalls, WAN optimization and network address translation (NAT) services. In a 5G implementation, VNF is a software implementation of a network equipment, such as a router, a firewall, a load balancer, or even the components that conform to the mobile core network. For example, syslog data is received, in which syslog data refers to the use of standard message format to communicate with a logging server. Also, the simple network management protocol (SNMP) may be used to monitor network performance.

In the illustrative embodiment, OAM data 154, RAN data 158 and VNF data 160 is received and integrated by the OPS-IQ software module 152, which is shared with an NWDAF application 162. The NWDAF application 162 allows data to be collected once and shared among many other applications and/or functions. In other words, the data sets that are processed by the OPS-IQ software module 152 are then shared with the NWDAF application 162 for enrichment and for NWDAF exfiltration to the network functions described in further detail below.

The NWDAF application 162 combines the 3G and 4G datasets with 5G data sets and the NWDAF data is shared with one or more network functions by the NWDAF application. By way of example and not of limitation, the NWDAF functions are shared by an illustrative subscription service with the access and mobility management function (AMF) 164, the session management function (SMF) 166, the network slice selection function (NSSF) 168, the policy control function (PCF) 170, the network exposure function (NEF) 172, the application function (AF) 174 an OAM event function 176 and other such network functions.

The data set from NWDAF is shared with the access and mobility management (AMF) function 164. The core AMF functions include registration management, connection management, reachability management, mobility management and various functions relate to security and access management and authorization. With respect to the NWDAF interaction and the AMF function, AMF subscribes to NWDAF to take session management function (SMF) load information from NWDAF into consideration for SMF selection.

Additionally, the data set from NWDAF is shared with the session management function (SMF) 166, which is one of the main functions in the next generation core. More specifically, SMF includes various functionality relating to subscriber sessions, i.e., session establishment, modification, and release. The NWDAF interaction supports taking user plane function (UPF) load information from NWDAF into consideration for UPF selection. UPF performs user plane operations like maintaining a session, packet routing and forwarding, packet inspection, policy enforcement for the user plane and other such user plane operations.

Also, the data set from NWDAF is shared with the network slice selection function (NSSF) 168, which supports local level information from NWDAF, which is taken into consideration for slice selection. The NSSF accesses the NWDAF subscription service via an illustrative N34 reference point. Note, the N34 reference point is a reference point between the NSSF and the NWDAF.

Furthermore, the data set from NWDAF is shared with the policy control function (PCF) 170, which supports the unified policy framework that governs network behavior. The PCF provides policy rules to the control plane functions to enforce them. The subscription information is gathered from the unified data management function. The NWDAF interaction takes input from NWDAF into consideration for policies on assignment of network resources and for traffic steering policies. There is a subscription for analytics information during background data transfer from the NWDAF to determine whether the negotiated transfer policy is impacted. The NWDAF also takes analytics information associated with Quality of Service (QoS) sustainability from the NWDAF into consideration for QoS policies.

Further still, the NWDAF data set is shared with the network exposure function (NEF) 172, which provides a way to securely expose the services and capabilities provided by the 3GPP network functions. The NWDAF interaction supports forwarding UE mobility information from NWDAF to the application function (AF) when it is untrusted, forwarding UE communication information from the NWDAF to the AF when it is untrusted, and forwarding user data congestion information from NWDAF to the AF when it is untrusted.

Further yet, the NWDAF is shared with the application function (AF) 174, in which the application front end (AFE) serves as the lightweight front-end access to the unified data repository (UDR). For example, for a mobile switching center server (MSC-S) to access subscriber data stored in the UDR, it must communicate with home location registry (HLR) application front end (AFE). Similarly, for the mobile management entity (MME) to access subscriber data, it must communicate with the home subscriber server (HSS) application front end (AFE). With respect to the NWDAF interaction, the NWDAF interaction supports receiving UE mobility information from NWDAF or via the NEF, supported UE communication information from NWDAF or via the NEF and supports receiving user data congestion information from NWDAF or via the NEF.

Figure 2A:
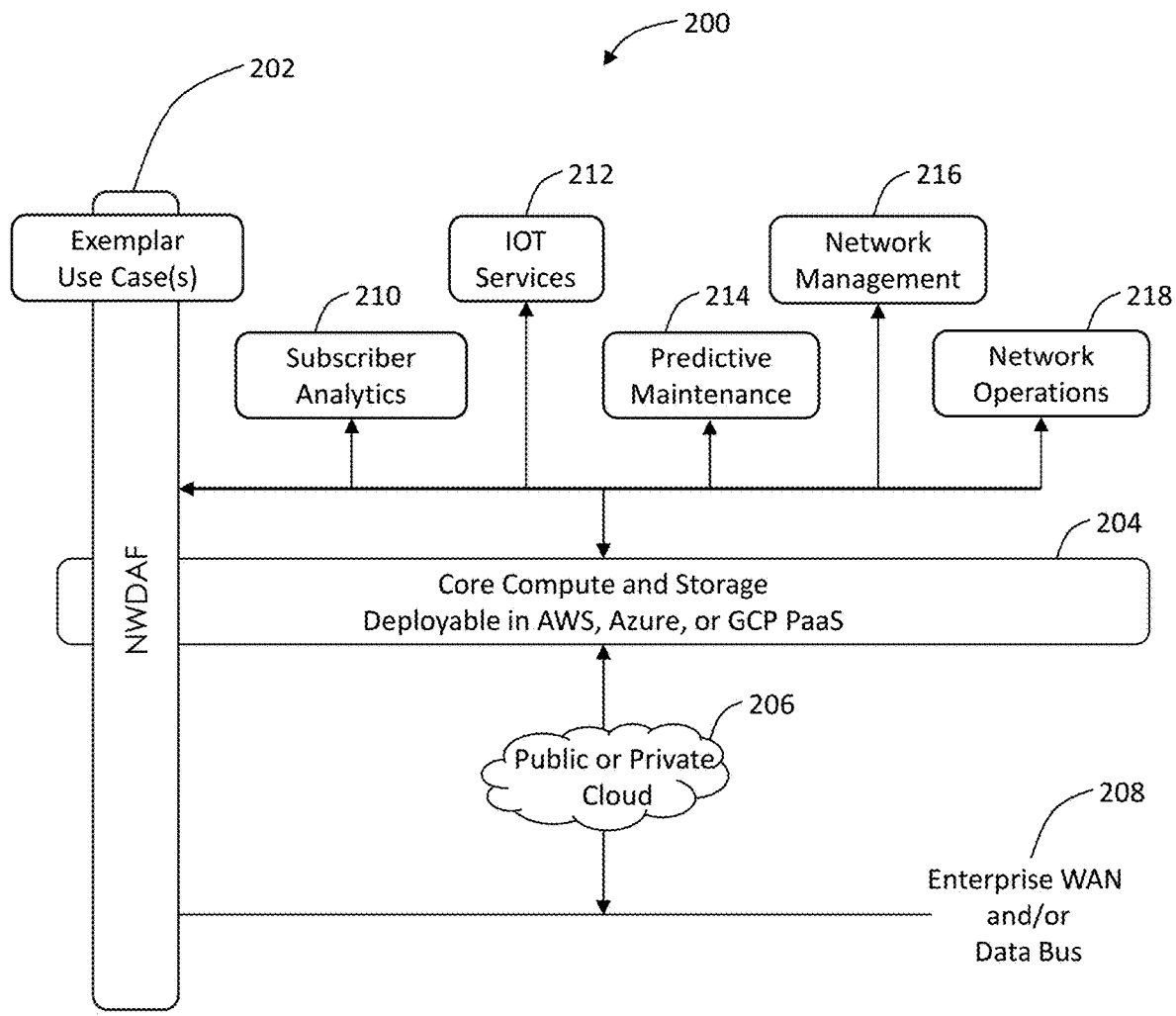
FIGS. 2A, 2B and 2C show a network analytics architecture that includes NWDAF operating as a network element and a data collection source.
Figure 2B:
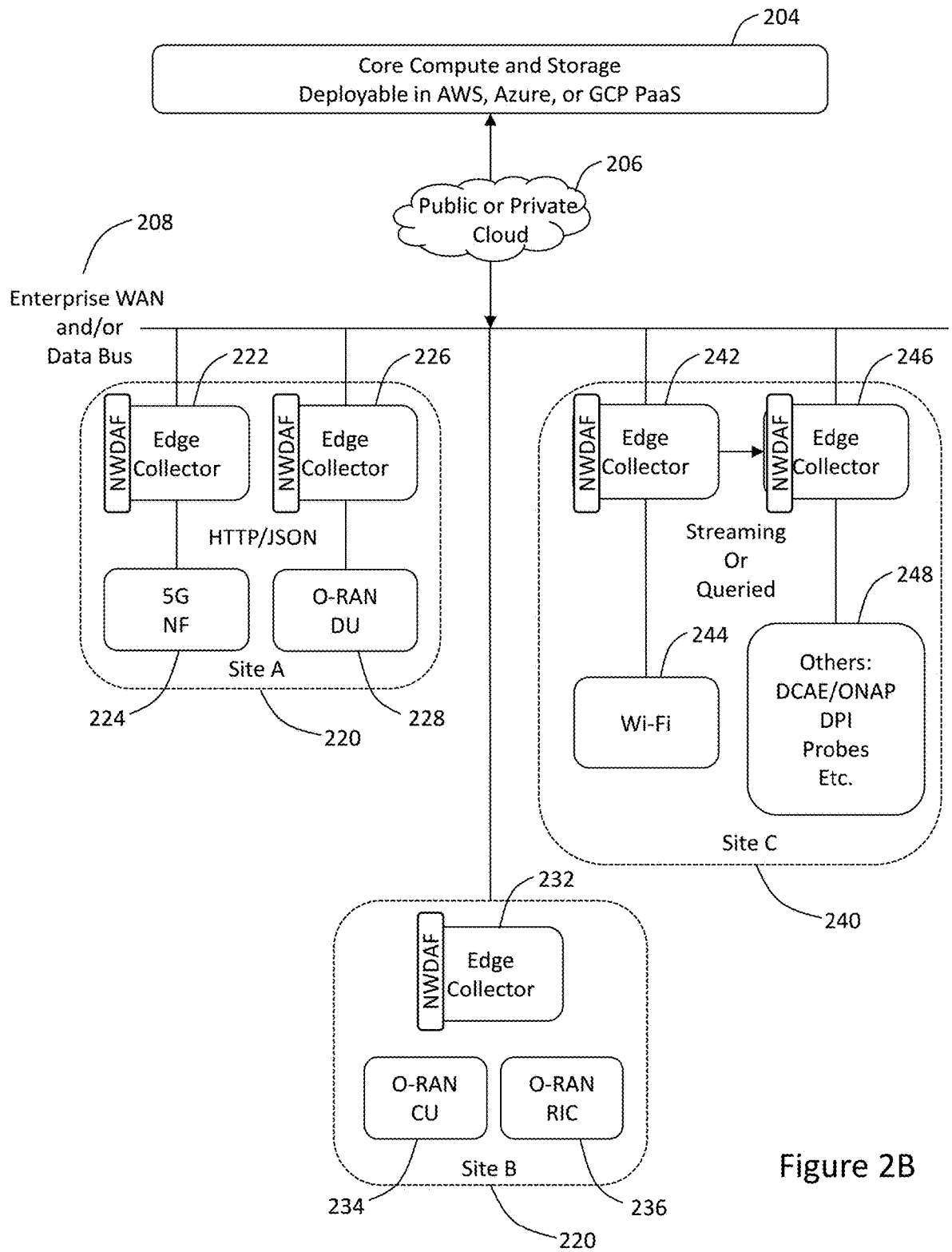
Figure 2C:
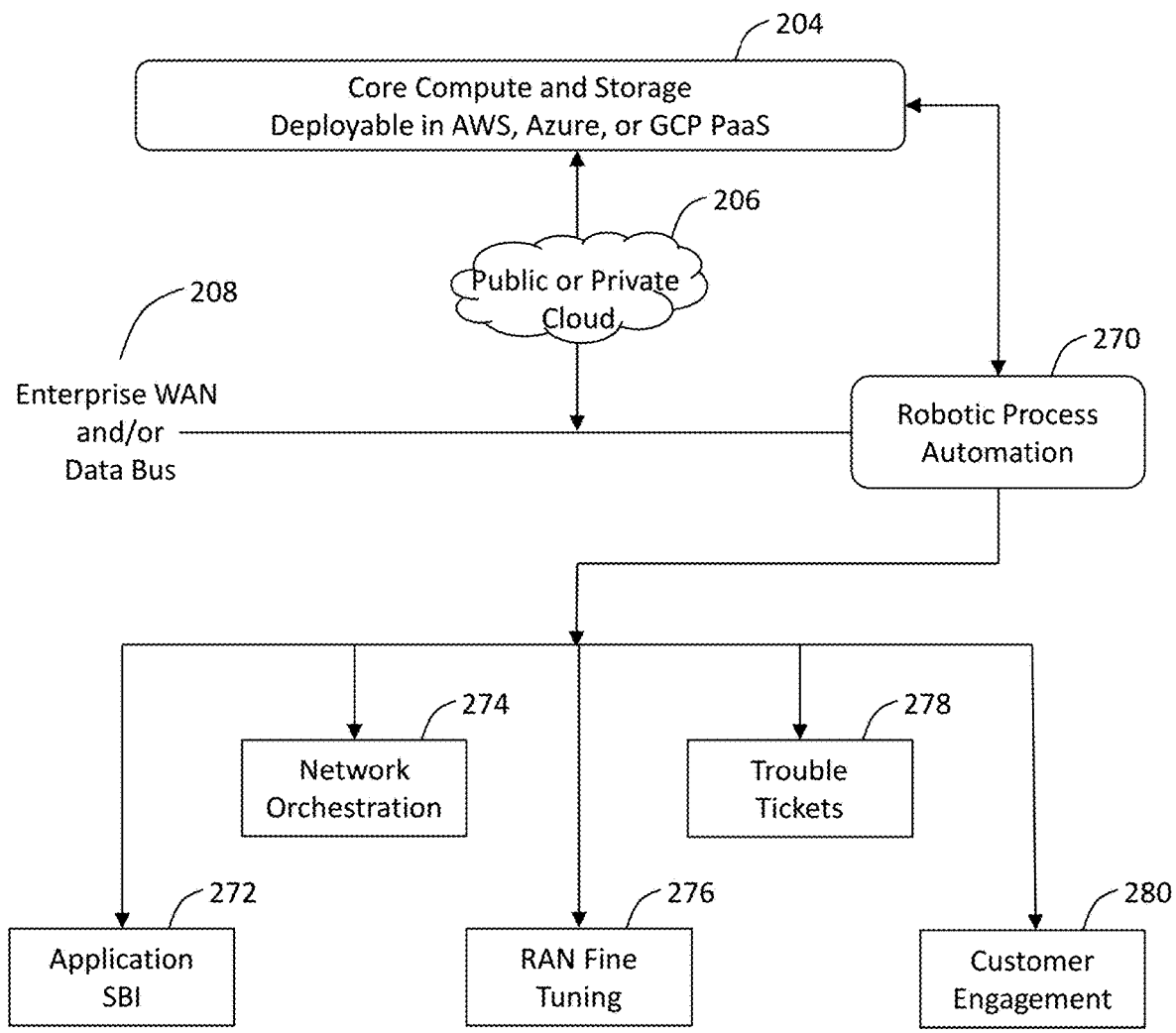

Referring to FIGS. 2A, 2B and 2C there is shown a network analytics architecture that includes NWDAF operating as a network element and a data collection source. In FIG. 1B presented above, the NWDAF application was presented. NWDAF may operates as an application, a network element, and as a data collection source in a distributed architecture.

In FIGS. 2A, 2B, and 2C, the network analytics architecture 200 supports NWDAF and management data analytics (MDAF) in a CSP application and robotic process automation (RPA). NWDAF may operate as application that supplements and compliments a variety of network functions as described above in FIG. 1B. The systems and methods described herein integrate with 5G data sources and with 3G and 4G applications. By way of example and not of limitation, the systems and methods described herein integrate with test equipment, a radio access network (RAN), the transport layer and other such elements of a 3G, 4G and 5G communication networks to create an end-to-end analytics framework that operates across different vendors and domains.

The systems and methods presented herein integrate with 5G and open radio access network (O-RAN) data sources. By way of example and not of limitation, the integration is performed using an open API architecture that operates using JavaScript open notation (JSON) to perform a hypertext transfer protocol (HTTP) request. The network analytics architecture 200 collects data in a distributed environment and encrypts the data near the point of collection. By way of example and not of limitation, the systems and methods operate using a hybrid platform-as-a-service (PAAS) architecture, in which the core compute and storage operations may be deployed in an illustrative Amazon Web Services (AWS) cloud and edge data collection and obfuscation can be deployed on premises. Additionally, as described in further detail below, the systems and methods support robotic process automation (RPA) and integrate with legacy APIs or with complex process controls. Note, the RPA actions are monitored to validate that the RPA actions achieve the desired results.

The systems and methods overcome the issues associated with network analytics having non-standardized interfaces and inconsistent data collection techniques by leveraging the network data analytics function (NWDAF), which is defined as part of the 5G architecture by 3GPP. NWDAF incorporates standard interfaces from the service-based architecture to collect data by subscription or request from other network functions and similar procedures. These standard interfaces deliver analytics functions in the network for automation or reporting, which overcomes the challenges related to non-standardized interfaces and inconsistent data collection.

The network analytics architecture 200 shown in FIGS. 2A, 2B and 2C uses an NWDAF events subscriptions service. The NWDAF subscription service enables network functions to subscribe to and unsubscribe from different NWDAF analytic events. Also, the NWDAF subscription service notifies the network functions about observed events. Observed events include load level of network slice instance, service experience for an application or for a network slice, load analytics information for one or more network functions, network performance in an area of interest, expected behaviour information for mobile devices, abnormal behaviour for mobile devices, mobility information for mobile devices, communication patterns for mobile device, congestion information in a specific location, and QoS sustainability. NWDAF provides analytics information for different analytic events to the consuming network functions. Additionally, NWDAF allows network functions to subscribe to and unsubscribe from periodic notification and/or notification when an event is detected.

Referring to FIG. 2A there is shown analytics, services, maintenance, network management and network operations interfacing with NWDAF and a core compute and storage component. The network analytics architecture 200 includes exemplar NWDAF use cases 202 that are listed by 3GPP for 5G. The exemplar NWDAF use cases 202 include identifying a load-level computation and prediction for a network slice instance. Another NWDAF use case includes service experience computation and prediction for an application and/or user equipment (UE) group. Additionally, load analytics information and prediction for a specific network function (NF) may also be determined with NWDAF. Network load performance computation and future load prediction can also be performed with NWDAF. With respect to UE devices, NWDAF use cases include a UE expected behavior prediction, identifying abnormal behavior, anomaly detection, mobility related information, mobility related prediction, and communication pattern prediction. Another NWDAF use case relates to congestion information at a current location and at a predicted location and identifying or predicting changes to Quality of Service (QoS).

Although 3GPP has identified the various NWDAF use cases 202, the implementation for the various use cases has not been provided by the 3GPP. Additionally, the NWDAF use cases identified by 3GPP do not focus on developing analytics for ensuring the best customer experience in 5G networks or hybrid networks that also include 4G capabilities. The systems and methods presented herein provide various implementations for QoE that measures the customer experience with an application or service based on the fulfilment of his or her expectation with respect to the application or service. The illustrative NWDAF use cases 202 interface with a core compute and storage component 204 that may be deployed in an AWS cloud, Azure cloud or as a platform-as-a-service (PaaS).

In the illustrative embodiment, the core compute and storage component 204 is stored in a private or public cloud 206, which is accessed via an enterprise wide area network (WAN). Alternatively, the core compute and storage component 204 may also be accessed via a data bus associated with a server, network appliance, or other such network component having a data bus. Note the core compute and storage component 204 is associated with the QoE network appliance 121 described above.

The core compute and storage component 204 also collects subscriber data with the subscriber analytics module 210. The subscriber analytics module 210 collects subscriber data such as financial data, geographic and demographic information, internet usage data and other such data that can be used to generate customer profiles for determining subscriber QoE.

The core compute and storage component 204 also receives data related to IoT services 212. With respect to IoT services 212, IoT devices must adhere to strict network usage and connect at a relatively low price. The strict limits of bandwidth, the number of session connections, the duration of the network connections and other such attributes are necessary to establish the cost of supporting the IoT application. From the CSP perspective, the IoT devices must be monitored to ensure they comply with the agreed upon requirements. IoT devices are often highly distributed and deployed in areas that are not easily serviced, thus, there is a need to easily resolve IoT issues efficiently. The systems and methods described herein can be used to monitor IoT devices. In operation, an IoT baseline QoE may be established. By way of example and not of limitation, the IoT baseline QoE may include a destination IP addresses, IoT module type, e.g., vendor/model), connection frequency, and bandwidth consumed. Deviations from the IoT baseline QoE alert both the CSP network and an IoT service provider.

The systems and methods described herein enable the CSP to comply with contractually agreed parameters such as connectivity time, bandwidth consumed, and other such network parameters. The IoT device issues may be resolved by identifying the issues as a CSP network issue, an IoT service provider issue or an IoT device manufacturer issue. By way of example and not of limitation, a provisioned IoT device that fails to connect would be outside of normal behavior and additional data for root cause analysis are reviewed. RAN logs are collected to determine if the IoT device had attempted to connect to the network and if CSP network congestion could be a reason the IoT has failed to connect. Thus, observing RAN logs would quickly determine if the IoT device was attempting to connect or not. Also, it is possible to determine if the problem is a one-off issue or a systemic issue. If the issue is systemic, the failure is quickly identified and provided to the IoT service provider.

The core compute and storage component 204 also receives data from predictive maintenance module 214. The predictive maintenance module 214 measures historical and real-time data from network elements to understand the process of service degradation before failure. Additionally, the predictive maintenance module 214 predicts which network elements are more likely to fail in the upcoming days or hours using predictive analytics tools and techniques.

The core compute and storage component 204 is also communicatively coupled with a network management module 216. The network management module 216 performs network performance management, future provisioning, network vulnerability management and network energy infrastructure management. Network management 212 is performed with remote monitoring, automated monitoring, troubleshooting, configuration, and optimization of the network.

Furthermore, the core compute and storage component 204 is communicatively coupled to a network operations module 218. Network operations 218 refers to the activities performed by internal networking staff or third parties that the CSPs rely on to monitor, manage, and respond to alerts on their network's availability and performance.

Referring to FIG. 2B there is shown the NWDAF edge collectors communicatively coupled to the core compute and storage component 204 located in a private cloud or public cloud 206, which can be accessed with a data bus or an enterprise wide area network (WAN). At illustrative site A 220 there is a first site A NWDAF edge collector 222 that interfaces with the 5G network functions (NF) 224 described above. Additionally, at site A 220 there is a second site A edge collector 226 that interfaces with the open radio access network (O-RAN) distributed unit (DU) 228. As is well known in the art, the distributed unit (DU) sits close to the radio unit (RU) and runs the Radio Link Control, Medium Access Control, and parts of the Physical (PHY) layer. The RU is the radio unit that handles the digital front end and the parts of the PHY layer and the digital beamforming functionality.

At illustrative site B 230 there is a site B NWDAF edge collector 232 that interfaces with the open radio access network (O-RAN) centralized unit (CU) 234. As is well known in the art, the CU runs the radio resource control (RRC) and packet data convergence protocol (PDCP) layers. The site B NWDAF edge collector 232 also interfaces with an open radio access network (O-RAN) RAN intelligent controller (RIC) 236. The RIC 236 provides advanced control functionality, which delivers increased efficiency and better radio resource management.

At illustrative site C 240 there is shown a first site C NWDAF edge collector 242 that interfaces with subscribers' Wi-Fi access point(s) 244. Also, at site C 240 there is a second site C edge collector 246 that interfaces with data collection, analytics, and events (DCAE) associated with the Open Network Automation Platform (ONAP) 248. The ONAP platform enables product-independent capabilities for design, creation, and lifecycle management of network services. ONAP uniquely provides a unified operating framework for vendor-agnostic, policy-driven service design, implementation, analytics and lifecycle management for large-scale workloads and services. The second site C edge collector 246 may also interface with deep packet inspection (DPI) probes and other such inspection methods. DPI is used to locate, detect, categorize, block, or reroute packets that have specific code or data payloads that are not detected, located, categorized, blocked, or redirected by conventional packet filtering. Unlike plain packet filtering, deep packet inspection goes beyond examining packet headers.

For 5G architecture, 3GPP provides a series of logical interfaces for NWDAF and the management data analytics function (MDAF). In the illustrative embodiment, a variety of exemplary interfaces are used. For example, a first interface enables NWDAF to interact with the application function (AF) using the network layer service based interface (SBI). An illustrative second interface is associated with an N1 reference point, which is between the UE and the AMF, and the N2 reference point that is between the RAN and the AMF. An illustrative third interface includes the operational and management (O&M) layer, which configures the NF profile in the network repository function (NRF) and NWDAF collects the network function (NF) capacity information from the NRF. In an illustrative fourth interface, the MDAF interacts with application/tenant using northbound interfaces (NBI). In an illustrative fifth interface, the MDAF interacts with radio access network (RAN) data analytics function (DAF) using O&M layer service based interface (SBI). In an illustrative sixth interface, NWDAF consumes the services provided by MDAF using cross layer SBI. In an illustrative seventh interface, MDAF consumes the services provided by NWDAF using cross layer SBI. In an illustrative eighth interface, MDAF collects data from NW layer via trace file/monitoring services.

Referring to FIG. 2C there is shown a robotic process automation (RPA) module interfacing with the core compute and storage component. The NWDAF data analytics described above are consumed by a robotic process automation (RPA) module 270, which can provide actionable data and/or intelligence for planning systems, operations systems, and predictive maintenance systems.

Generally, the RPA module 270 is used to manage and/or control operational tasks by communicating actionable events to various network functions or RAN systems that affect the QoE. In the illustrative embodiment, the RPA module 270 receives the NWDAF data and identifies actionable events, which may then be communicated to a service based interface (SBI) 272. The actionable events identified by the RPA module 270 may also be used for network orchestration 274, RAN fine tuning 276, generating trouble tickets 278 and improving customer engagement 280.

The RPA module 270 may integrate with legacy APIs or complex process controls. In the illustrative embodiment, the RPA module is associated with the QoE network appliance, and where appropriate the impact of the RPA action is monitored to ensure the action achieved the desired results. Robotic process automation enables a CSP employee to configure a "robot" to emulate the actions of a human interacting within digital systems to execute a business process. RPA robots utilize the user interface to capture data and manipulate applications just like humans do. RPA robots interpret, trigger responses, and communicate with other systems in order to perform a vast variety of repetitive tasks.

The systems and methods described herein provide an analytics strategy that includes an RPA module that receives and processes an integrated event stream, which is described in FIG. 7. The integrated event stream refers to data captured by the WAN/data bus that is communicatively coupled to the RPA module 270. For example, the integrated event stream may include the RAN data set, the CN data set, the NWDAF data set, the QoE latency measurement, the QoE bandwidth measurement, and the QoE packet loss rate measurement. Additionally, the integrated event stream may include data sets collected from other edge based collectors. Furthermore, the integrated event stream may include network events. As described previously, network events may include all requests caused by a user interaction, a user action, a network interaction, and a subrequest. Note, not all network events are initiated by a user as described previously.

In the illustrative embodiment, the integrated event stream is generated by the QoE network appliance. The integrated event stream provides a temporal perspective, a geographic perspective, and a topological perspective. These different perspectives can be used to correlate events and identify degradation of service and further identify the root issue that is causing the problem. The integrated event stream provides more valuable information than a single NWDAF event stream because correlations can be made at various wireless communication levels, from analyzing the various data sets and network events to determine the cause of the network degradation.

The RPA module receives the integrated event stream and can separate the integrated event stream data into a temporal event stream, a geographic event stream and a topological event stream. Each event stream is processed by the RPA module 270, which is communicatively coupled to one or more automation modules that perform the actionable events. The illustrative automation modules may include the application service based interface (SBI) module 272, a network orchestration module 274, a RAN fine tuning module 276, a trouble tickets module 278 and a customer engagement module 280.

Figure 3A:
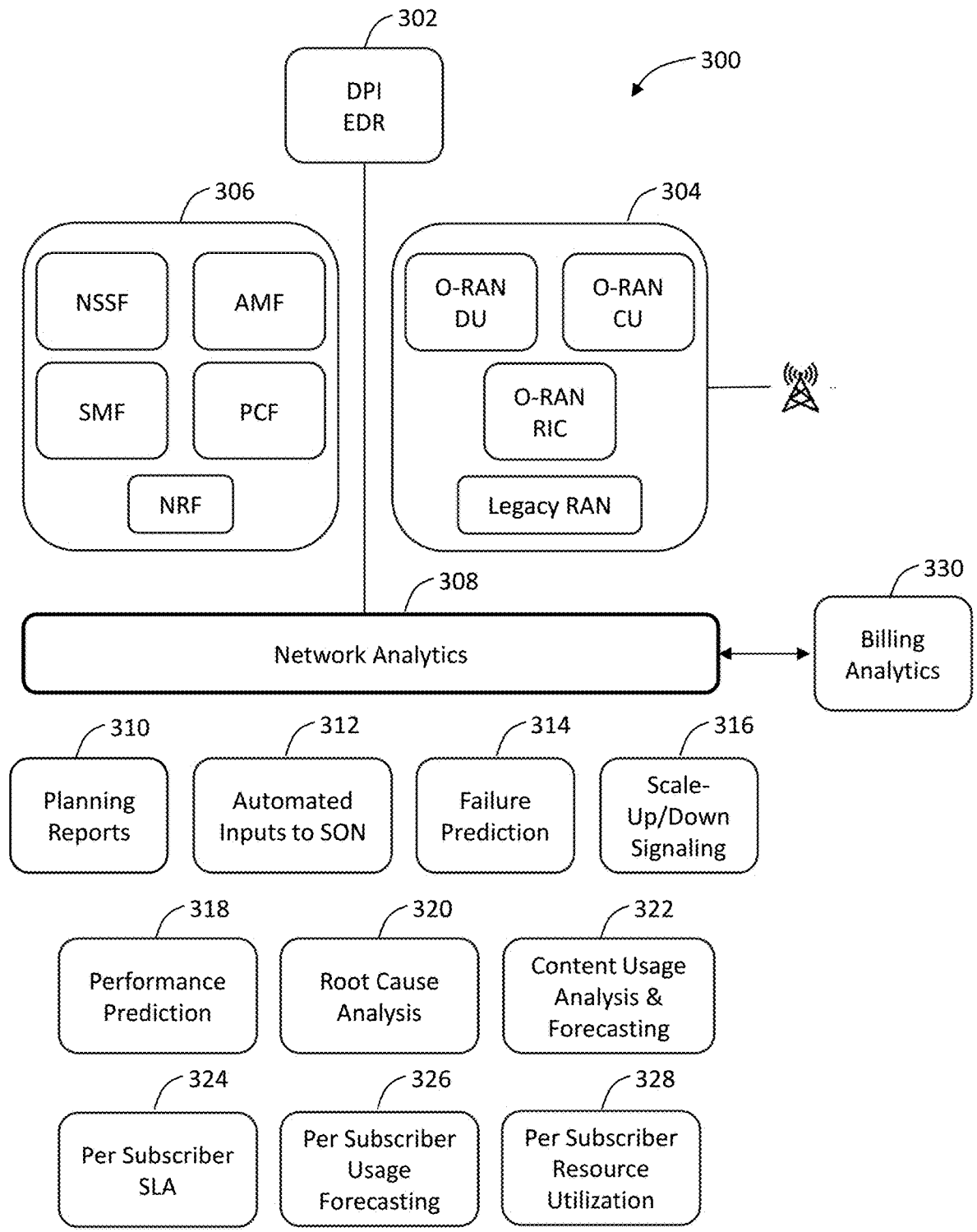
FIGS. 3A and 3B show an illustrative high-level network analytic billing system that charges subscribers based on the QoE.
Figure 3B:
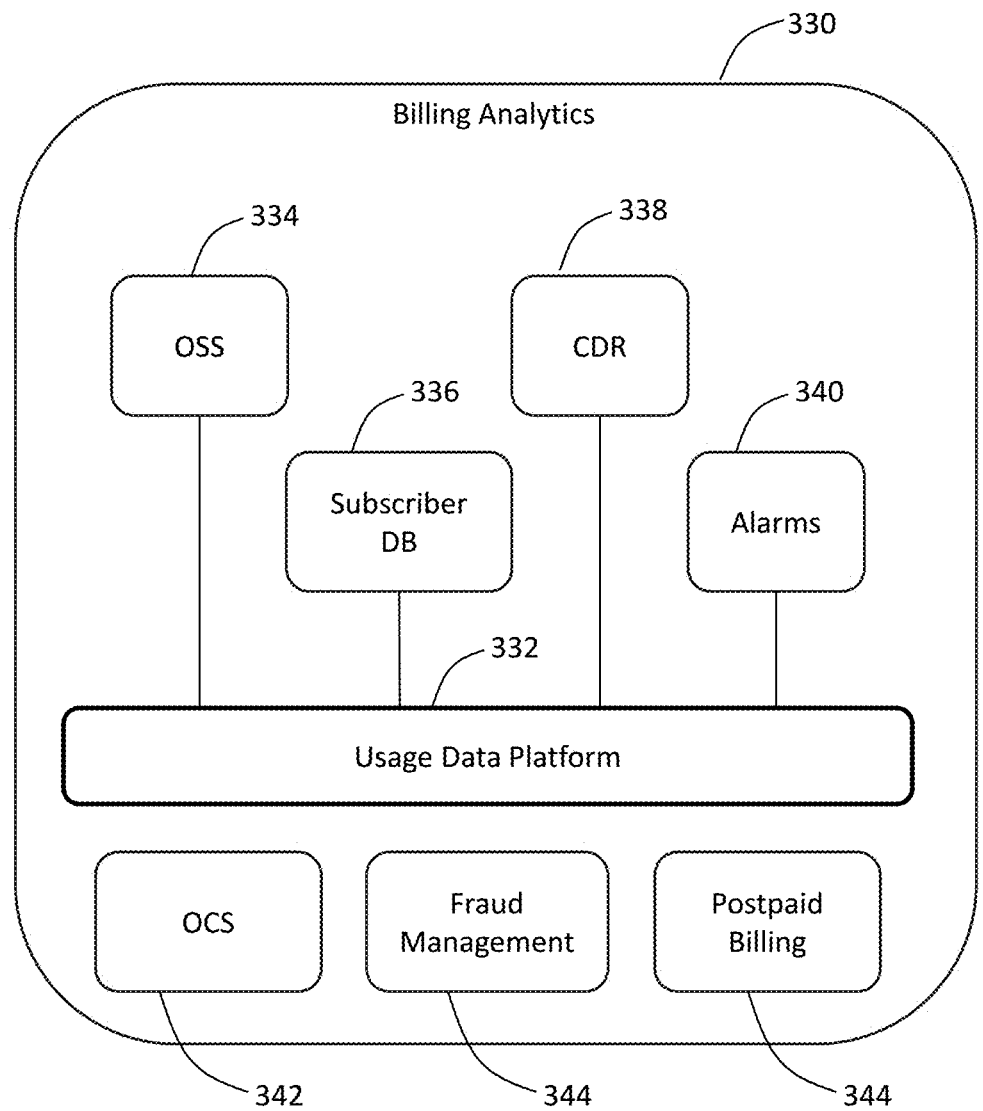

Referring to FIG. 3A and FIG. 3B there is shown an illustrative high-level network analytic billing system that charges subscribers based on the QoE. FIG. 1 presented an OPS-IQ software module that integrated data sets from 4G networks, 5G networks and hybrid networks, and then the integrated data sets were communicated using NWDAF. FIGS. 2A, 2B, 2C presented a system that used NWDAF to obtain real-time or pseudo real-time network analytics for data analysis and to determine actions that affect various QoE parameters. FIG. 3A presents the illustrative network analytic billing system 300 for billing subscribers based on the QoE that is determined using the NWDAF data sets.

The illustrative network analytic billing system 300 receives QoE data from deep packet inspection (DPI) and event detail records (EDR) module 302. As previously described, DPI is used to locate, detect, categorize, block, or reroute packets that have specific code or data payloads that are not detected, located, categorized, blocked, or redirected by conventional packet filtering. EDR refers to event characteristics for any activity that can be monitored.

Additionally, the network analytic billing system 300 receives data from various radio access networks (RAN) 304 such as legacy RAN, O-RAN DU, O-RAN CU and O-RAN RIC. Legacy RAN platforms are based on proprietary hardware. The open radio access network (O-RAN) distributed unit (DU) sits close to the radio unit (RU) and runs the RLC, MAC, and parts of the PHY layer. The RU is the radio unit that handles the digital front end and the parts of the PHY layer and the digital beamforming functionality. The open radio access network (O-RAN) centralized unit (CU) 234 runs the radio resource control (RRC) and packet data convergence protocol (PDCP) layers. The open radio access network (O-RAN) RAN intelligent controller (RIC) 236 provides advanced control functionality, which delivers increased efficiency and better radio resource management.

The network analytic billing system also receives data from network functions 306 such as the network slice selection function (NSSF) which supports taking information from the NWDAF into consideration for slide selection. The NSSF accesses the NWDAF subscription service. The access and mobility management (AMF) function includes registration management, connection management, reachability management, mobility management and various functions related to security and access management and authorization. With respect to the NWDAF interaction and the AMF function, AMF subscribes to NWDAF to take session management function (SMF) load information from NWDAF into consideration for SMF selection. The Policy Control Function (PCF) supports the unified policy framework that governs network behavior. The PCF provides policy rules to control plane functions to enforce them. The NWDAF interaction takes input from the NWDAF into consideration for policies on assignment of network resources and for traffic steering policies.

The Network Exposure Function (NEF) provides a way to securely expose the services and capabilities provided by a 3GPP network functions, e.g., third party, internal exposure, and internal re-exposure. The NWDAF interaction supports forwarding UE mobility information from NWDAF to the Application Function (AF) when it is untrusted. Additionally, the NWDAF interaction also supports forwarding UE communication information from NWDAF to the AF when it is untrusted. Furthermore, the NWDAF interaction forwards user data congestion information from NWDAF to the AF when it is trusted.

The DPI data 302, RAN data 304 and NWDAF data 306 are received by an illustrative network analytics cloud component 308 that may operate similarly to core compute and storage component 204 described above and shown in FIGS. 2A-C. Other data received by the network analytic cloud component 308 includes, by way of example and not of limitation, planning reports 310, automated inputs to self-organizing networks (SON) 312, failure prediction 314, scale up/down signaling 316, performance prediction 318, root cause analysis 320, content usage analysis and forecasting 322, per subscriber service level agreement (SLA) 324, per subscriber usage forecasting 326, per subscriber resource utilization 328.

More specifically, planning reports 310 include at least one of statistical information about infrastructure, expenditures, use, data for optimizing infrastructure and identify ways to reduce costs. Automated inputs for self-organizing networks (SON) 312 refers to more dense and complex networks having automated inputs that are associated with self-organizing networks (SON). Failure prediction 314 refers to predictive analysis that predicts network failures. Scale-up/down signaling 316 enables CSPs to conduct infrastructure capacity planning, select and deploy resources in the cloud or at the edge. Performance prediction 318 refers to using existing measurement data to predict network performance where direct measurements are not available. Root cause analysis 320 refers to problem solving that is used to identify the root causes of faults or problems. Content usage analysis and forecasting 322 relates to the analysis of the content usage and forecasting content usage. Per subscriber service level agreement (SLA) 324 refers to the CSP monitoring subscriber services agreed upon between the subscriber and the CSP. Per subscriber usage forecasting 326 refers to forecasting the usage on a per subscriber basis. Per subscriber resource utilization 328 refers to the utilization of the network on a per subscriber basis.

The network analytic cloud component 308 passes the various data sets to the billing analytics module 330, which is depicted in further detail in FIG. 3B. The billing analytics module 330 includes a usage data platform 332. By way of example and not of limitation, an illustrative usage data platform 332 includes Digital Route. The illustrative usage data platform 332 converts raw usage data into billable items in order to enable usage based business models. The platform interacts with the most critical revenue systems, ensuring accurate billing to subscribers.

An operations support system (OSS) 334 is communicatively coupled to the usage data platform 332. OSS 334 includes order management, network inventory management and network operations.

A subscriber database (DB) 336 is also communicatively coupled to the usage data platform 332. The subscriber DB 336 includes a database with subscriber information such as billing address and personal information about the subscriber. The subscriber DB 336 may also include metadata about mobile applications that the subscriber opens and the duration that the mobile application is open.

The call data record (CDR) 338 or extended data record interfaces with the usage data platform 332. Note, for purposes of this patent the call data record 338 also refers to an extended data record.

Network analytics provide true visibility into each subscriber session. Thus, if the service is delivered as expected, the call detail record (CDR) 338 would reflect that the service was delivered as expected. If the service is not delivered as expected, the CDR would also reflect that the service was delivered inadequately. This ability to monitor the subscriber session makes it possible for the CSP to bill the subscriber based on each subscribers QoE. In operation, the hybrid 5G and 5G network analytics tabulate all the resources utilized, verify the service the subscriber was consuming, verify that the network delivered those packets with the quality expected by the customer, and generate a CDR that is passed to billing.

The alarms 340 are communicatively coupled to the usage data platform 332. The alarms alert the CSP to problems indicated by the CSP. These problems are weighted based on severity levels as critical, major, or minor.

The online charging system (OCS) 342 also interfaces with the usage data platform. The OCS is a system allowing a CSP to charge their subscribers, in real time, based on their service usage.

A fraud management component 344 is communicatively coupled to the usage data platform 332. The fraud management component 344 monitors calls in real time for suspicious traffic or call patterns.

A postpaid billing 346 interfaces with the usage data platform 332. Postpaid billing 346 bills the subscriber after the service has been provided based on the use of the mobile service. Generally, the mobile services are billed at the end of each month.

The systems and methods described herein enable the CSP to bill the subscriber based on the quality of experience (QoE). By way of example and not of limitation, a subscriber and CSP agree to particular type of QoE video quality, and the subscriber is charged on a monthly basis for the QoE video quality. However, if the CSP does not provide the QoE video quality, the subscriber is not charged for the QoE video quality service.

Figure 4:
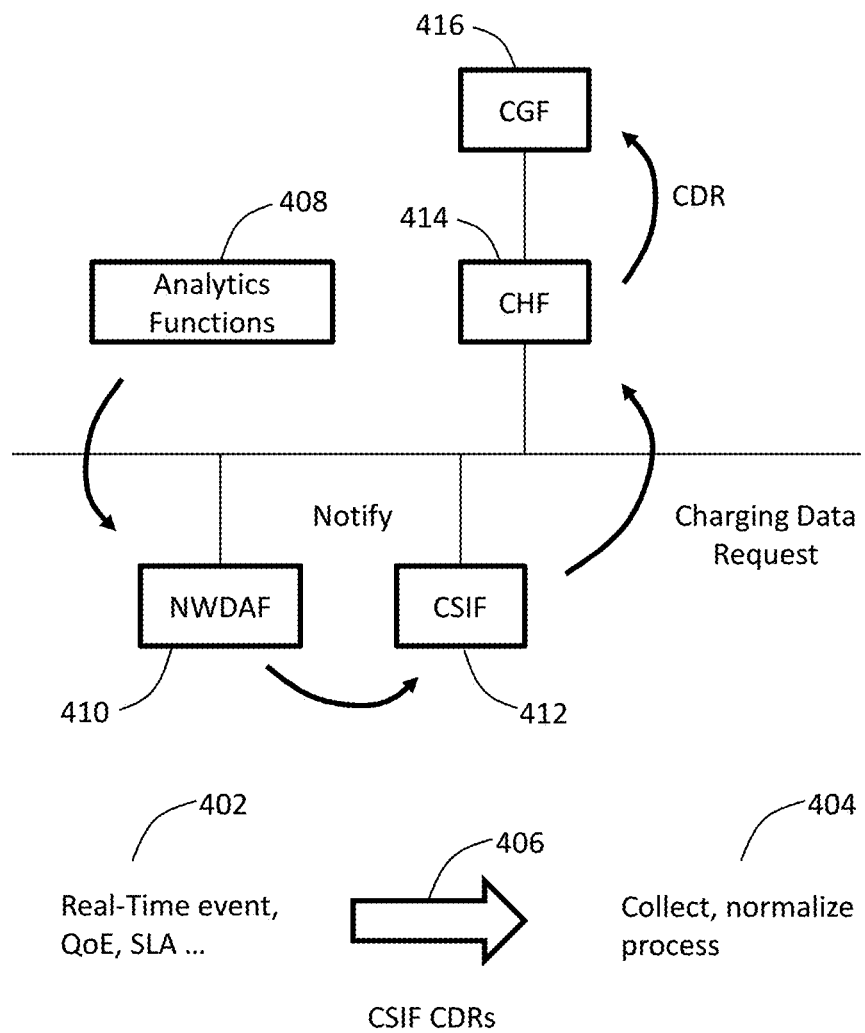
FIG. 4 shows a block diagram having various components for an event based billing mediation system 400, which operates with the systems described in FIG. 1 through FIGS. 3A and 3B.

Referring to FIG. 4 there is shown a block diagram of various components for an event based billing mediation system 400, which operates with the systems described in FIG. 1 through FIGS. 3A and 3B. In summary, there are two separate processes occurring in FIG. 4. The first process 402 is a real-time event analysis, which determines the quality of experience (QoE) based on the service level agreement (SLA) 324. The second process 404 collects and normalizes the data with the usage data platform 332 for event based billing. The core switch interface (CSIF) call detail record (CDR) 406 having the QoE SLA data is passed to the usage data platform.

The event based billing mediation system 400 can operate for various network slices and can support different business models such as different business-to-business applications (B2B), e.g., IoT applications and subscriber applications.

The different B2B application have different service level agreement (SLA) and QoE, which are based on various network performance variables. By way of example and not of limitation, the different network performance variables include a latency variable, a throughput variable, a maximum utilized bandwidth variable, a maximum packet loss rate variable, a service experience statistics variable, a number of protocol data unit (PDU) session variables, a registered subscriber variable, a load level information variable, and other such variables. In 5G, the protocol data unit (PDU) session provides end-to-end user plane connectivity between the mobile device and a specific data network through the user plane function. A PDU session supports one or more QoS flows.

In operation, the illustrative event billing mediation system 400 receives a plurality of analytics functions 408 which are processed as network analytics using NWDAF 410, which notifies the core switch interface (CSIF) 412. The CSIF then transmits a charging data request to a charging function (CHF) 414. The CHF 414 can include both an online charging function and a charging data function. The CHF then passes a call detail record (CDR) to a charging gateway function (CGF) 416. The CGF 416 acts as a gateway between the CSP network and the billing domain (not shown).

The CSP network analytics described above provide the CSP with an understanding of the cost of providing the subscriber service(s). The systems described above utilize network analytics to charge differently for different QoE. In operation, the hybrid 5G and 5G network analytics tabulate all the resources utilized, verify the service the subscriber was consuming, verify that the network delivered those packets with the quality expected by the customer, and generate a detailed Call Detail Record (CDR) that is passed to billing as described above.

Depending on whether the CSP network satisfied the customer QoE, the CSP bills the subscriber based on delivering packets with the quality expected and the customer would pay for the improved experience. If the QoE was not satisfied, the subscriber would not be billed and the CSP would have a full record of the reason the network did not meet the QoE requirements.

Figure 5A:
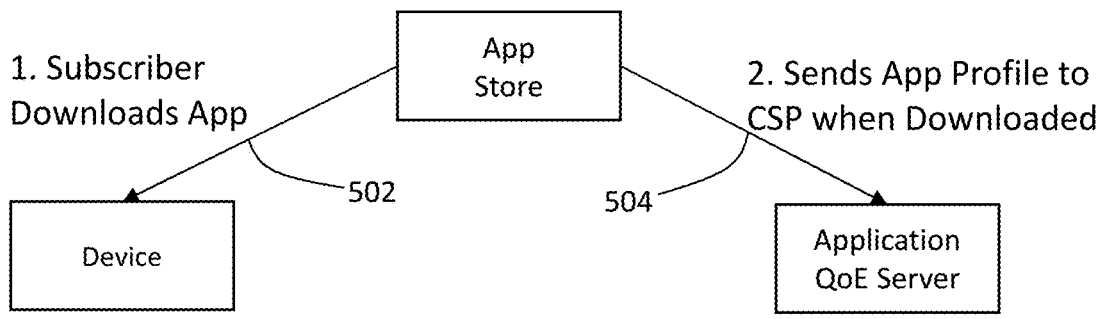
FIGS. 5A, 5B and 5C show various methods for communicating application QoE requirements and the integration of the QoE requirements with applications.
Figure 5B:
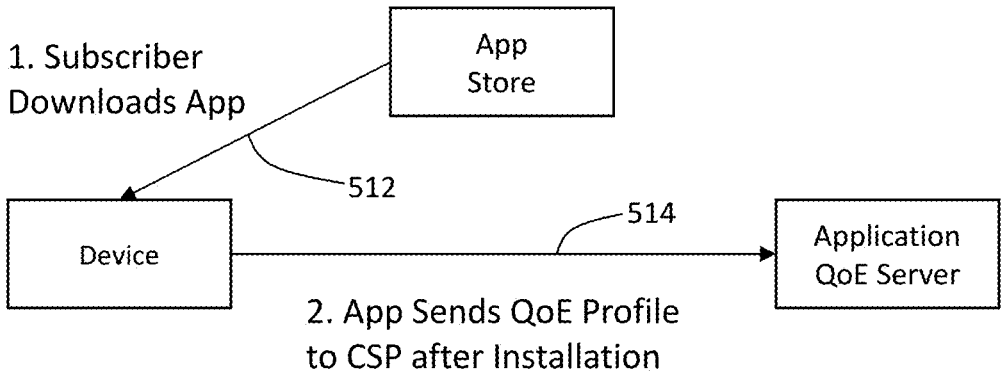
Figure 5C:
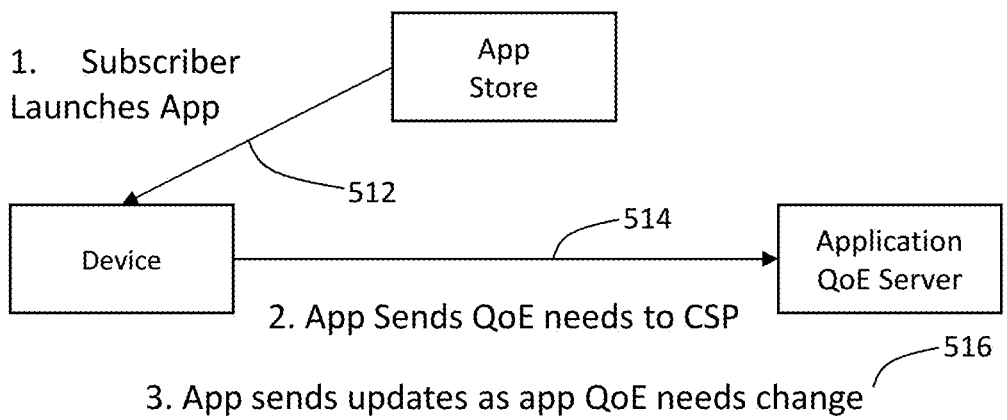

Referring to FIGS. 5A, 5B and 5C there is shown various methods for communicating application QoE requirements and the integration of the QoE requirements with applications. An "application" includes a mobile application downloaded from an app store or pre-loaded on a computing device or upgrading a mobile application to provide new services. Subsequently, the application is executed on the mobile device and is communicatively coupled to the Internet using the CSP network. The illustrative application operates according to the terms of a service level agreement (SLA), which is a commitment between the CSP and the subscriber that relates to the expected QoE. Although, the subscriber is typically an individual, the subscriber may also be an IoT device, and IoT service or a mobile virtual network operation (MVNO).

In a first embodiment, the application is registered with the CSP. During this registration process the CSP and the application owner create an authentication code that is used to validate the authenticity of the application owner. For example, the authentication code may include the application name, which is registered with the CSP network. The CSP network associates the authentication code with a QoE requirement that includes a minimum bandwidth. Other QoE requirements include latency, jitter, and packet loss requirements. In operation, the information passed from the application to the CSP include one or more of an authentication code, an IP Address for the subscriber, an IMSI or MSISDN, an IP address of the server, a name of the application, an application start time and other such application information. Additionally, during the application session, QoE parameters are monitored and used to optimize CSP network performance as described herein.

In the embodiment shown in FIG. 5A, the application is downloaded from the app store at arrow 502. Also, a message is sent from the mobile device to the CSP, at arrow 504, with the name of the application, the subscriber ID (IMSI, MSISDN), and the bandwidth requirements, packet loss rate needs, and latency to the application QoE server. The application QoE server is associated with the CSP network and may also be referred to as a QoE network appliance as described herein. The term "QoE server" is provided for simplicity.

In the illustrative embodiment shown in FIG. 5B, the CSP detects that the application is on the CSP network after the subscriber downloads the application, at arrow 512. When the application is launched, a message is sent to a designated QoE server in the CSP network at arrow 514. The message sent at arrow 514 makes the CSP network aware that the application is running. When the application is terminated, the application sends a close message to the server.

In the illustrative embodiment shown in FIG. 5C, the application operates in a manner similar to that of FIG. 5B, except there are additional process steps that relate to QoE updates due to changing application requirements. Therefore, process steps associated with arrow 512 and arrow 514 continue as in FIG. 5B. Additionally, there is a process step 516, in which the application sends a message to the application QoE server to provide mobile application updates and to improve the QoE requirements from interim or preliminary QoE requirements—that were obtained during the initial download. For example, the application may be running in the background and consuming few network resources, and when the application is in use by the subscriber the QoE requirements are updated accordingly. In another illustrative embodiment, a gaming application may require more network resources to satisfy the QoE during game play—so the update alerts the CSP of the need for more network resources.

In a fifth embodiment (not shown), the CSP network would observe the integrated event stream to identify that the application is running. The CSP network then proceeds to generate a time-based baseline of CSP network resources needed to support the application. The time-based baseline is used to determine the QoE requirements for the application. Additionally, the CSP network can monitor the measured QoE over an extended period of time. The CSP determines the QoE requirements for the application with inferential systems, such as DPI, NWDAF network analytics, or other such analytics.

The network analytics used to determine the QoE requirement are not limited to bandwidth, latency, and packet loss. Other network analytics may also be used to determine the QoE requirement including CN analytics, NWDAF analytics, RAN analytics, DPI analytics, and content analytics that continuously monitor the network efficiency, subscriber usage, and service operational patterns.

In operation, edge collection operates by collecting data from a networked device operating at the "edge" of the network. For example, NWDAF may perform edge collection as described above. Also, DPI is gathered using an edge collection process and/or module. Furthermore, RAN data can also be collected, but the collection process is slower. RAN data is also collected on the edge of the network. The edge collection process communicates the received analytic data sets to the core network QoE network appliance. The analytic data sets can be collected from a single location or from multiple locations. By way of example and not of limitation, the illustrative core network is GUAVUS® and/or THALES® compute and storage network component, which is also referred to as a QoE network appliance.

The collected data sets may be stored on the edge of the network or at the QoE network appliance. The analytic data sets can vary and depend on the particular type of traffic that is gathered at the edge location. The core compute and storage associated with the QoE network appliance support use cases across the whole network and gathers data from a plurality of edge locations.

In general, the data sets collected by the core compute system is used to generate an "action." The action may have an associated API that can be used to provide process automation or access to other APIs. APIs are used to process data sets, generate actions, and communicate with other APIs. By way of example and not of limitation, the illustrative systems and methods teach that edge collection of data in a distributed network that is received and processed by a core compute and storage network component 204 that generates an integrated event stream which can undergo a robotic process automation (RPA) and/or be communicated to a billing network component. The network analytics architecture supported by the systems and methods described herein is highly distributed and is not standards based.

The network analytics continuously provide detailed end-to-end visibility from the RAN to the Internet to ensure resources are running optimally for the entire subscriber base. The systems and methods described herein monitor resource utilization, content demand forecasts, and operational analytics to give the CSP visibility and control that allows additional services to be operated. Additionally, continuous content analytics ensure that the work-from-home slice is being used in accordance with CSP policies to identify fraudulent usage.

The systems and methods combine network analytics and billing, which gives the CSP the ability to offer new services and monetize the new services. The systems and methods enable CSPs to offer new service level agreements (SLAs) to subscribers and IoT devices, which represents a new revenue model for CSP networks.

Referring to FIGS. 6A, 6B, and 6C there is shown an illustrative flowchart for determining a QoE requirement, measuring satisfaction of QoE, billing for QoE, resolving unsatisfactory QoE. More specifically, the method 600 satisfies a quality of experience (QoE) requirement for an application executed on a mobile device that accesses a CSP network. Additionally, the method 600 determines a CSP network policy based on the QoE. Furthermore, the method 600 resolves an unsatisfactory QoE for an application executed on a wireless device that accesses a communication service provider (CSP) network.

In FIG. 6A, the method 600 is initiated at block 602 where an illustrative mobile application is registered for QoE. By way of example and not of limitation, the mobile application is downloaded from an application store, which is also referred to as an "app store." In one embodiment, downloading of the mobile application from the app store is communicated to one or more network appliances associated with the CSP network.

At block 604, an illustrative authentication code is communicated to the QoE network appliance. The method also includes registering an authentication code, which is associated with the mobile application. The illustrative authentication code is used to authenticate the UE communications with the CSP network.

In the illustrative embodiment, the method also registers an application name associated with the mobile application. The method proceeds to communicate at least one of the authentication code and the application name from the mobile application, which is executed on the UE, to the QoE network appliance. In a further illustrative embodiment, the RAN data set and an authentication data set determine when a wireless device is communicatively coupled to the CSP network.

At block 606, the RAN data, CN data, and NWDAF data related to the subscriber QoE are identified and/or communicated to the QoE network appliance. Additionally, an IP address associated with the subscriber, a subscriber ID, an IP address for a QoE network appliance, and an application start time may be identified and/or communicated to the QoE network appliance.

In the illustrative embodiment, an edge-based collection module gathers the RAN data set, the CN data set and the NWDAF data set. Additionally, the edge-based collection module may be configured to reduce a volume of data from the RAN data set, the CN data set and NWDAF data set before communicating the reduced volume of data to the QoE network appliance.

In a further illustrative embodiment, a deep packet inspection (DPI) data set is also identified and/or communicated to the network appliance. The DPI data set is selected from the open system interconnection (OSI) group consisting of a network layer, a transport layer, a session layer, a presentation layer, and an application layer. In the illustrative embodiment, the DPI data set is also associated with the latency measurement, the bandwidth measurement, and the packet loss rate measurement.

The RAN data set, the CN data set and the NWDAF data set are associated with a latency requirement, a bandwidth requirement, and a packet rate loss requirement to determine the subscriber QoE requirement for the mobile application. Additionally, the systems described above may use edge processing for improved latency response by optimizing network resources with data sets that include one or more of RAN data, CN data, NWDAF data, DPI data and other such data that can be associated with a latency response.

At block 608, the subscriber QoE requirement is determined after gathering the RAN data set, the CN data set, the NWDAF data set with the edge-based collection module. In an illustrative embodiment, the subscriber QoE requirement is determined at the QoE network appliance with at least one of the RAN data set, the CN data set and the NWDAF data set.

In one illustrative embodiment, the method for determining a QoE requirement includes registering the QoE requirement that is associated with the mobile application and the QoE requirement is communicated from the mobile application executed on the UE to the QoE network appliance.

In another embodiment, the method for determining a QoE requirement includes communicating a QoE message that is sent from the UE to the CSP network after downloading the mobile application to the mobile device. The QoE message includes the QoE requirement for the illustrative mobile application and the name of the application.

In yet another embodiment, the method for determining a QoE requirement includes launching the mobile application on the UE and communicating a QoE message from the mobile device to the QoE network appliance. The QoE message indicates that the mobile application is being executed on the mobile device and a "close" message is communicated from the UE to the QoE network appliance when the mobile application is terminated.

In a further embodiment, the method for determining a QoE requirement includes initiating the mobile application and generating an updated QoE message that is communicated from the mobile application to the QoE network appliance, while the mobile application is being executed on the mobile device. The QoE message includes an updated activity for the mobile application and an interim QoE requirement corresponding to the updated activity. The CSP network then proceeds to modify the network resources to satisfy the interim QoE requirement.

In still a further embodiment, the method for determining a QoE requirement further includes enabling the CSP network to generate an inferred mobile application QoE requirement based on the mobile application usage of CSP network resources. The inferred mobile application QoE requirements includes an inferred latency requirement, an inferred bandwidth requirement and an inferred packet loss rate requirement.

In yet another illustrative embodiment, determining the application QoE requirement includes generating a QoE fingerprint that can be used to identify the mobile application. Additionally, the QoE fingerprint includes the RAN data set, the CN data set and NWDAF data set.

At decision diamond 610, data sets are gathered during an illustrative call session. For the illustrative DPI data set, the data may be gathered over a time interval such as two to three minutes and then the DPI data set is passed to the block 614 to determine the measured QoE score. For the illustrative RAN data, CN data and NWDAF data, the data sets are gathered in real-time at block 612 and passed to block 614.

At block 614, a measured QoE score is generated for the subscriber session with the illustrative mobile application. The measured QoE score is determined in real-time. The measured Quality of Experience (QoE) score is generated with the RAN data set, the NWDAF data set and the CN data set. Additionally, the measured QoE score is associated with the latency measurement, the bandwidth measurement, and the packet loss rate measurement.

In another embodiment, the method includes determining, with the DPI data set, an optimal bandwidth measurement for a particular application. The optimal bandwidth measurement is associated with the measured QoE score. Additionally, the DPI data set can be used to determine an optimal latency measurement for the particular application, in which the optimal latency measurement is associated with the measured QoE score. The DPI data set may also be used to determine when the measured QoE score satisfies the customer QoE requirement.

In a further embodiment, the method associates a QoE data record with a QoE API, in which the QoE data record includes the measured QoE score. Also, a notification is generated about changes to the measured QoE with the QoE API.

The method 600 continues in FIG. 6B at block 616, where the measured QoE score is compared to the QoE requirement. In one illustrative embodiment, the process step at block 616 determines when the measured QoE score satisfies the customer QoE requirement by comparing the latency requirement, the bandwidth requirement, and the packet loss rate requirement associated with the customer QoE requirement, with the latency measurement, the bandwidth measurement, and the packet loss rate measurement associated with the measured QoE score.

In another embodiment, the process step 616 communicates a QoE message that is sent from the mobile device to the CSP network after downloading the mobile application to the mobile device. The QoE message includes the application QoE requirement for the application. The CSP network detects the mobile application on the CSP network. The measured QoE score is monitored for compliance with the application QoE requirement. The measured QoE score is stored so that other mobile devices using the mobile application can access the RAN data set, the NWDAF data set and the CN data set.

In yet another embodiment, the process step 616 includes forecasting, at the QoE network appliance, a per device network load for a scaling model with the RAN data set, the CN data set and the NWDAF data set. In yet another embodiment, the method includes forecasting, at the network appliance, a per application network load for a scaling model with the RAN data set, the CN data set and the NWDAF data set. In still another embodiment, the method includes forecasting, at the network appliance, a per location network load for a scaling model with the RAN data set, the CN data set and the NWDAF data set.

At decision diamond 618, the network policy is continuously reevaluated to determine whether a change in CSP network policy is needed. Initially, the CSP network policy is based on the QoE requirement. Also, the measured QoE score may be used to establish the network policy. The measured QoE score is shared as a call data record that is associated with a particular subscriber ID. In the illustrative embodiment, a billing system records the QoE requirement associated with the mobile application, the measured QoE score, and the CSP network policy in a call data record.

A change in the network policy may be based on the measured QoE score for a particular subscriber at a particular location, which is associated with a particular cell. When reduced network performance is detected with a low measured QoE score at an impacted area, the CSP network alerts the UE of the reduced network performance. The reduced network performance can also be used to determine how to charge the user for services as described herein.

By way of example and not of limitation, the change in network may result in increasing the pricing to maintain the QoE or reducing the pricing due to the low measured QoE score. If there is a change in network policy, the change may result in changing the QoE requirement (not shown) or continuing to measure the QoE score to determine if there is a change in measured QoE score at block 614.

At block 620, the particular subscriber is billed for services when the measured QoE score satisfies QoE requirement for the particular call session. In operation, the subscriber ID is charged when the measured QoE score satisfies the QoE requirement.

At decision diamond 622, a determination is made whether to change the QoE requirement or change the pricing based on measured QoE score. The illustrative QoE network appliance determines how to charge the particular subscriber based on the initial QoE requirement, the modified QoE requirement, and the measured QoE score during each call session. When the method 600 determines to change the QoE requirement or pricing, the methods 600 returns to block 616. When the method 600 determines not to change the QoE requirement or pricing, the methods 600 proceeds to decision diamond 624.

At decision diamond 624, a determination is made regarding a call session having a consistently low measured QoE score. If the measured QoE score during the call session is satisfactory, the method ends. However, if the call session(s) have a consistently low measured QoE score, the decision diamond may indicate that an unsatisfactory QoE is not caused by the CSP network because the CSP network satisfies the application QoE requirement.

In operation, the decision diamond 624 may have a correlation module that determines that a low measured QoE score affects a plurality of wireless devices. For example, faulty WiFi associated with the customer's premises may be the cause of a low measured QoE score; and the correlation module detects the faulty Wi-Fi.

If a consistently low measured QoE score is identified at decision diamond 624, the method proceeds to block 626. At block 626, a network orchestration module adds or removes network resources. In operation, an illustration QoE message is communicated to the network orchestration module, which then adds or removes one or more network resources, which changes the measured QoE score.

If the consistently low measured QoE score does not improve, the method proceeds to block 628 in FIG. 6C where an anomaly detection step is performed. An "anomaly" is detected within the illustrative RAN data set, the CN data set, and the NWDAF data set by identifying a behavior associated with the wireless device that causes the measured QoE score to not satisfy the application QoE requirement when the CSP network should satisfy the application QoE requirement. The anomaly detection step may include generating a baseline based on location to determine CSP network resource requirements for each mobile application. Once the baseline is determined, an effective operational range is associated with the baseline, and any data points that fall outside of the operational range are identified as anomalies.

At block 630, a root cause analysis (RCA) is performed when the steps described in blocks 626 and 628 fail. Root cause analysis refers to a process of problem solving to determine the root causes of faults and problems.

At block 632, a congestion notification is generated and communicated. There are two types of congestion notifications, namely, a network congestion notification and subscriber congestion notification.

Network congestion is congestion that is detected on a RAN or slice. A network congestion notification is generated and communicated to billing analytics 330 (shown in FIG. 3a) and other back office systems as needed. The purpose for the network congestion notification is to enable the CSP to take particular actions, which may include alerting the subscriber of network congestion, trigger increased billing rates, trigger changes in network policy to restrict network resources made available to one or more subscribers, trigger an increase in network resources by expanding cloud-based computing resources. By way of example and not of limitation, the network congestion notification also includes time, subscriber ID(s), top applications in use by subscribers ordered by bandwidth consumed, slice ID(s), cell ID(s), congestion degree (1 to 10 with 1 being least and 10 being most), and congestion prediction which predicts the duration of a congestion period in minutes.

A subscriber congestion notification would be sent from Network Analytics to one or more back office systems to provide a full record of the impact of the congestion to the subscriber. Similar to a network congestion notification, the subscriber level congestion notification provides per subscriber level of information to the CSP with detailed information of network usage during the congestion event. By way of example and not of limitation, the congestion notification includes subscriber ID, applications in use by subscribers and ordered by bandwidth consumed, slice ID, cell ID(s), congestion degree from 1 to 10 with 1 being least and 10 being most, congestion prediction with predicted duration of congestion period in minutes, RAN latency before an event and during the event, RAN throughput before the event and during the event, and maximum usable bandwidth before the event and during the event.

Referring to FIG. 7 there is shown a method 700 for generating an integrated event stream that is communicated to a robotic process automation (RPA) module. The method 700 begins at block 702 where the RAN data set, the CN data set and the NWDAF data set are associated with a QoE requirement that includes, but is not limited to, a QoE latency requirement, a QoE bandwidth requirement, and a QoE packet rate loss requirement as described above.

Note, the systems described above may use edge processing for improved latency response by optimizing network resources with data sets that include one or more of RAN data, CN data, NWDAF data, DPI data and other such data that can be associated with a latency response.

The illustrative process step at block 702 monitors data sets at a particular edge-based collection module, e.g., an eNodeB base station. Also, the process step at block 702 monitors the data sets at a plurality of edge-based locations for different types of network traffic. Note, the systems and methods collect data from the edge of the network and process the data in a distributed manner.

At block 704, the edge-based collection module(s) then pass the data to the QoE network appliance that includes a core compute component and a storage component. The QoE network appliance then stitches the data together to generate a consolidated call data record. In other words, the data from one or more edge-based collection modules is "stitched" together at the QoE network appliance with data sets collected or gathered from the edge-based collectors.

There may be different types of stitched data based on different services. For example, in a fiber network, the stitched data comes from edge-based collectors associated with the fiber network. An IP network has different network devices than the fiber network and, consequently, the service level will be different for the IP network versus the fiber network. In the illustrative embodiment, the data that is stitched or combined together includes, but is not limited to, RAN data sets, CN data sets, NWDAF data sets and DPI data sets.

At block 706, an integrated event stream is then generated. The integrated event stream includes the RAN data set, the CN data set, the NWDAF data set, the QoE latency measurement, the QoE bandwidth measurement, and the QoE packet loss rate measurement. Additionally, the integrated event stream includes data sets collected from other edge-based collectors. Also, the integrated event stream may include network events. As described previously, network events may include all requests caused by a user interaction, a user action, a network interaction, and a subrequest. Note, not all network events are initiated by a user as described previously.

The integrated event stream is generated by the QoE network appliance. The integrated event stream provides a temporal perspective, a geographic perspective, and a topological perspective. These different perspectives can be used to correlate events and identify degradation of service and further identify the root issue that is causing the problem.

For example, if there is an outage in the fiber network that has ripple effects across the IP network, then the outage in the fiber network may or may not service degradation to the customer at the IP network level. The systems and methods described herein enable a CSP network to evaluate all the events in the network to identify patterns that indicate there is actually a service degradation to the subscriber QoE. If service degradation is detected at the QoE level, then the systems and methods described herein can be used to identify "what" happened, at the "what" layer to cause the service degradation to occur.

The integrated event stream provides more valuable information than a single NWDAF event stream because correlations can be made at various wireless communication levels, from analyzing the various data sets and network events to determine the cause of the network degradation. More specifically, correlations can be based on time, geography, and network topology. Note, network topology refers to all areas in the network that are having issues other than just a particular geographical location. Thus, the system and method described herein is performing a temporal correlation, a geographical correlation, and a topological correlation.

The integrated event stream is then transferred to the robotics process automation (RPA) module or a custom API integration. Additionally, the integrated event stream may be communicated to a central repository that can be used to generate the measured QoE score.

In one illustrative embodiment, the integrated event stream is a network analytic that is communicated as a "data record." By way of example and not of limitation, the data record is generated at the end of a TCP session with cumulative statistics related to the session. Interim data records may be generated before the end of a TCP session. Data records may be produced in the event of congestion or could be generated for all sessions depending on the needs of the CSP. The data records may include start/stop time, unique record ID, subscriber ID (IP Address, IMSI, MSISDN), application ID(s), RAN latency, RAN throughput, maximum utilized, bandwidth, maximum packet loss rate, service experience statistics, number of PDU sessions, slice load level information and measured QoE score.

At block 708, the integrated event stream is used as an analytic input for the robotics process automation (RPA) module. The systems and methods described above provide an architecture that supports automated actions being performed by the RPA. The RPA includes a set of test criteria for the action taken, in which the test criteria determine the success or failure for the action taken.

Additionally, a remote action engine (RAE) associates a result with the action taken by the RPA. The RAE then proceeds to test whether the action taken produced the desired result based on a test criteria. The test criteria is associated with the action taken to determine if the action taken produced the desired result.

For example, the process steps described may be applied to an illustrative voice call to determine the QoE of the voice call. Previously, the data for related to setting up a call, determining the quality of the call, and analysis of call termination were analyzed separately—so there was no integrated data stream. The systems and methods described herein bring this disparate data together as an integrated data stream that is used as a single index to analyze call quality by determining the measured QoE score.

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for measuring quality of experience (QoE) satisfaction for an application associated with one or more subscribers that are accessing a communications service provider (CSP) network, where QoE refers to a measure of customer experience with a communications service, the application executing on a mobile device that is communicatively coupled to the CSP network, wherein the CSP network associates an authentication code with a QoE requirement;

the method executing on a processor and memory of a QoE network appliance communicatively coupled to the CSP network wherein the memory includes computer instructions which when executed by the processor causes the processor to perform the operations of:

identifying a quality of experience (QoE) requirement from a QoE message received from the mobile device that includes the QoE requirement for the application associated with subscriber expectations of the one or more subscribers accessing the CSP network from an authentication code, the QoE requirement for the application includes a QoE latency requirement, a QoE bandwidth requirement, and a QoE packet loss rate requirement;

receiving a RAN data set, a CN data set and a NWDAF data set from an edge-collection module at CSP network edge that gathered the RAN data set, the CN data set and the NWDAF data set, wherein the QoE network appliance, includes a core compute and storage network component for receiving data from a predictive maintenance module that measures real-time data from network elements;

associating, at the QoE network appliance, the RAN data set, the CN data set, and the NWDAF data set with a QoE latency measurement, a QoE bandwidth measurement, and a QoE packet loss rate measurement related to said data;

generating an NWDAF integrated event stream stream from the data that includes:

the RAN data set, the CN data set, the NWDAF data set, the QoE latency measurement, the QoE bandwidth measurement, and the QoE packet loss rate measurement, and, wherein said NWDAF integrated event stream refers to data captured by a data bus associated with the QoE network appliance that is communicatively coupled to a robotic process automation RPA) module that:

receives the NWDAF integrated event stream, and separates the NWDAF integrated event stream data into a temporal event stream, a geographic event stream and a topological event stream, correlates network events, at the network appliance, to identify degradation of said communications service and identify a root issue that is causing a problem for said network events;

wherein the QoE network appliance generates a measured QoE score with the RAN data set, the CN data set, and the NWDAF data set wherein the measured QoE score is associated with the QoE latency measurement, the QoE bandwidth measurement, and the QoE packet loss rate measurement in view of the degradation of service; and determines when the measured QoE score satisfies the QoE requirement by comparing the QoE latency requirement the QoE bandwidth requirement, and the QoE packet loss rate requirement associated with the QoE requirement, with the QoE latency measurement, the QoE bandwidth measurement, and the QoE packet loss rate measurement associated with the measured QoE score;

and, by way of the RPA and a billing network component, billing a subscriber ID when a charging function determines the measured QoE score using real-time event analysis based on a service level agreement (SLA), that satisfies the QoE requirement, and having the charging function, which is communicatively coupled to a billing system, cause the billing system to bill the subscriber ID, and not billing the subscriber ID if the measured QoE score does not satisfy the QoE requirements.

2. The method of claim 1 further comprising identifying a deep packet inspection (DPI) data set, wherein the DPI data set is selected from the open system interconnection (OSI) group consisting of a network layer, a transport layer, a session layer, a presentation layer, and an application layer; and wherein the DPI data set is associated with the latency measurement, the bandwidth measurement, and the packet loss rate measurement;

wherein the DPI data set is also used to determine when the measured QoE score satisfies the QoE requirement.

3. The method of claim 2 wherein edge-based collection module reduces a volume of data from at least one of the DPI data set, the RAN data set, the NWDAF data and the CN data set before communicating the reduced volume of data to the QoE network appliance.

4. The method of claim 2 further comprising determining, with the DPI data set, an optimal bandwidth measurement for a particular application, in which the optimal bandwidth measurement is associated with the measured QoE score.

5. The method of claim 2 further comprising determining, with the DPI data set, an optimal latency measurement for the particular application, in which the optimal latency measurement is associated with the measured QoE score.

6. The method of claim 1 further comprising forecasting, at the QoE network appliance, a per device network load for a scaling model with at least one of the RAN data set, the NWDAF data set and the CN data set.

7. The method of claim 1 further comprising forecasting, at the QoE network appliance, a per application network load for a scaling model with the DPI data set, the RAN data set, the NWDAF data set and the CN data set.

8. The method of claim 1 further comprising forecasting, at the QoE network appliance, a per location network load for a scaling model with the DPI data set, the RAN data set, the NWDAF data set and the CN data set.

9. The method of claim 1 further comprising determining a CSP network policy;

determining a reduced network performance with the measured QoE score at an impacted area; and enabling the CSP network to alert at least one mobile device of the reduced network performance.

10. The method of claim 1 further comprising determining a CSP network policy; and changing the CSP network policy based on the measured QoE for the subscriber ID at a particular cell to charge the subscriber differently in real-time for different QoE thereby by providing event based billing mediation based on the integrated event stream, and enable a CSP network to understand customer experience and subscriber expectations based on application usage in real-time, wherein event based billing includes generation and communication of a congestion notification that is one of a network congestion notification and subscriber congestion notification.

11. The method of claim 1 further comprising billing a subscriber ID when a charging function determines the measured QoE satisfies the QoE requirement; and having the charging function, which is communicatively couple to a billing system, cause the billing system to bill the subscriber ID.

12. The method of claim 11 further comprising enabling the QoE network appliance to change a QoE requirement, which results in a price change for the changed QoE requirement.

13. A method for measuring quality of experience (QoE) satisfaction for an application associated with one or more subscribers that are accessing a communications service provider (CSP) network, where QoE refers to a measure of customer experience with a communications service, the application executing on a mobile device that is communicatively coupled to the CSP network, wherein the CSP network associates an authentication code with a QoE requirement;

the method executing on a processor and memory of a QoE network appliance, wherein the memory includes computer instructions which when executed by the processor causes the processor to perform the operations of:

identifying a quality of experience (QoE) requirement for the application associated with subscriber expectations of the one or more subscribers accessing the CSP network from an authentication code, the QoE requirement from a QoE message received from the mobile device that includes the QoE requirement for the application includes a QoE latency requirement, a QoE bandwidth requirement, and a QoE packet loss rate requirement;

receiving a RAN data set, a CN data set and a NWDAF data set with an edge-collection module at the CSP network edge that communicates with the QoE network appliance, which includes a core compute and storage network component for:

receiving data from a predictive maintenance module that measures real-time data from network elements associating, at the QoE network appliance, the RAN data set, the CN data set, and the NWDAF data set with the QoE latency measurement, the QoE bandwidth measurement, and the QoE packet loss rate measurement related to said data;

generating an NWDAF integrated event stream stream from the data that includes:

the RAN data set, the CN data set, the NWDAF data set, the QoE latency measurement, the QoE bandwidth measurement, and the QoE packet loss rate measurement, and, wherein said NWDAF integrated event stream refers to data captured by a data bus associated with the QoE network appliance that is communicatively coupled to a robotic process automation (RPA) module that:

receives the NWDAF integrated event stream, and separates the NWDAF integrated event stream data into a temporal event stream, a geographic event stream and a topological event stream, correlates network events, at the QoE network appliance, to identify degradation of said communications service and identify a root issue that is causing a problem for said network events;

generating, at the QoE network appliance, a measured QoE score from a temporal correlation, a geographical correlation, and a topological correlation of said integrated event stream with the RAN data set, the CN data set, and the NWDAF data set associated with the QoE latency measurement, the QoE bandwidth measurement, and the QoE packet loss rate measurement in view of the degradation of service;

determining when the measured QoE score satisfies the QoE requirement by comparing the QoE latency requirement the QoE bandwidth requirement, and the QoE packet loss rate requirement associated with the QoE requirement, with the QoE latency measurement, the QoE bandwidth measurement, and the QoE packet loss rate measurement associated with the measured QoE score; and by way of the RPA and a billing network component, billing a subscriber ID when a charging function determines the measured QoE score using real-time event analysis, based on a service level agreement (SLA) that satisfies the QoE requirement, and having the charging function, which is communicatively couple to a billing system, cause the billing system to bill the subscriber ID, and not billing the subscriber ID if the measured QoE score does not satisfy the QoE requirements.

14. The method of claim 13 further comprising enabling the QoE network appliance to change a QoE requirement, which results in a price change for the changed QoE requirement.

15. The method of claim 13 wherein edge-based collection module reduces a volume of data from at least one of the RAN data set, the NWDAF data set and the CN data set before communicating the reduced volume of data to the QoE network appliance.

16. The method of claim 13 further comprising forecasting, at the QoE network appliance, a per device network load for a scaling model with at least one of the RAN data set, the NWDAF data set and the CN data set.

17. The method of claim 13 further comprising forecasting, at the QoE network appliance, a per application network load for a scaling model with the DPI data set, the RAN data set, the NWDAF data set and the CN data set.

18. The method of claim 13 further comprising forecasting, at the QoE network appliance, a per location network load for a scaling model with the DPI data set, the RAN data set, the NWDAF data set and the CN data set.

19. The method of claim 13 further comprising determining a CSP network policy;

determining a reduced network performance with the measured QoE score at an impacted area; and enabling the CSP network to alert at least one mobile device of the reduced network performance.

20. The method of claim 13 further comprising determining a CSP network policy; and changing the CSP network policy based on the measured QoE for the subscriber ID at a particular cell to charge the subscriber differently in real-time for different QoE thereby by providing event based billing mediation based on the integrated event stream, and enable a CSP network to understand customer experience and subscriber expectations based on application usage in real-time, wherein event based billing includes generation and communication of a congestion notification that is one of a network congestion notification and subscriber congestion notification.

21. A system for measuring quality of experience (QoE) satisfaction for an application associated with one or more subscribers accessing a communications service provider (CSP) network, where QoE refers to a measure of customer experience with a communication service, the application executing on a mobile device communicatively coupled to the CSP network, wherein the CSP network associates an authentication code with a QoE requirement;
the system comprising a QoE network appliance including on a processor and memory, wherein the memory includes computer instructions which when executed by the processor causes the processor to perform the operations of:
identifying a quality of experience (QoE) requirement from a QoE message received from the mobile device that includes the QoE requirement corresponding to the application associated with subscriber expectations of the one or more subscribers that accesses the CSP network from an authentication code, the QoE requirement for the application includes a QoE latency requirement, a QoE bandwidth requirement, and a QoE packet loss rate requirement;
identifying a radio access network (RAN) data set gathered by an edge-collection module;
identifying a core network (CN) data set that is gathered by the edge-collection module, wherein the CN data set includes a network data analytics function (NWDAF) data set;
the QoE network appliance, which includes a core compute and storage network component, receiving the RAN data set, the CN data set and the NWDAF data set from the edge-collection module within CSP network, and receiving data from a predictive maintenance module \ that measures real-time data from network elements;
associating the RAN data set, the CN data set, and the NWDAF data set with the QoE latency measurement, the QoE bandwidth measurement, and the QoE packet loss rate measurement related to said data;
generating an NWDAF integrated event stream stream from the data that includes:
the RAN data set, the CN data set, the NWDAF data set, the QoE latency measurement, the QoE bandwidth measurement, and the QoE packet loss rate measurement, and,
wherein said NWDAF integrated event stream refers to data captured by a data bus associated with the QoE network appliance that is communicatively coupled to a robotic process automation (RPA) module that:
receives the NWDAF integrated event stream, and
separates the NWDAF integrated event stream data into a temporal event stream, a geographic event stream and a topological event stream,
correlates network events, at the QoE network appliance, to identify degradation of said communications service and identify a root issue that is causing a problem for said network events;
generating a measured QoE score from a temporal correlation, a geographical correlation, and a topological correlation of said integrated event stream with the RAN data set, the CN data set, and the NWDAF data set associated with the QoE latency measurement, the QoE bandwidth measurement, and the QoE packet loss rate measurement;
determining when the measured QoE score satisfies the QoE requirement by comparing the QoE latency requirement the QoE bandwidth requirement, and the QoE packet loss rate requirement associated with the QoE requirement, with the QoE latency measurement, the QoE bandwidth measurement, and the QoE packet loss rate measurement associated with the measured QoE score; and,
by way of the RPA and a billing network component, billing a subscriber ID when a charging function determines the measured QoE score using real-time event analysis based on a service level agreement (SLA) that satisfies the QoE requirement and having the charging function, which is communicatively couple to a billing system, cause the billing system to bill the subscriber ID, and not billing the subscriber ID if the measured QoE score does not satisfy the QoE requirements.

22. The system of claim 21 further comprising a deep packet inspection (DPI) data set, wherein the DPI data set is selected from the open system interconnection (OSI) group consisting of a network layer, a transport layer, a session layer, a presentation layer, and an application layer; and
wherein the DPI data set is associated with the latency measurement, the bandwidth measurement, and the packet loss rate measurement;
wherein the DPI data set is also used to determine when the measured QoE score satisfies the QoE requirement.

23. The system of claim 22 wherein edge-based collection module reduces a volume of data from at least one of the DPI data set, the RAN data set, the NWDAF data and the CN data set before communicating the reduced volume of data to the QoE network appliance.

24. The system of claim 22 wherein the DPI data set determines an optimal bandwidth measurement for a particular application, in which the optimal bandwidth measurement is associated with the measured QoE score.

25. The system of claim 22 wherein the DPI data set determines an optimal latency measurement for the particular application, in which the optimal latency measurement is associated with the measured QoE score.

26. The system of claim 21 wherein the QoE network appliance forecasts a per device network load for a scaling model with at least one of the RAN data set, the NWDAF data set and the CN data set.

27. The system of claim 21 wherein the QoE network appliance forecasts a per application network load for a scaling model with the DPI data set, the RAN data set, the NWDAF data set and the CN data set.

28. The system of claim 21 wherein the QoE network appliance forecasts a per location network load for a scaling model with the DPI data set, the RAN data set, the NWDAF data set and the CN data set.

29. The system of claim 21 further comprising a CSP network policy, in which a reduced network performance is determined with the measured QoE score at an impacted area, and the CSP network alerting at least one mobile device of the reduced network performance.

30. The system of claim 21 further comprising a CSP network policy that changes based on the measured QoE for the subscriber ID at a particular cell to charge the subscriber differently in real-time for different QoE thereby by providing event based billing mediation based on the integrated event stream, and enable a CSP network to understand customer experience and subscriber expectations based on application usage in real-time,
  wherein event based billing includes generation and communication of a congestion notification that is one of a network congestion notification and subscriber congestion notification.

\* \* \* \* \*